(12) United States Patent
Ue

(10) Patent No.: US 6,980,360 B2
(45) Date of Patent: Dec. 27, 2005

(54) FOCUS STABILIZING APPARATUS

(75) Inventor: Yoshihiro Ue, Hidaka (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/636,142

(22) Filed: Aug. 6, 2003

(65) Prior Publication Data

US 2004/0027656 A1 Feb. 12, 2004

Related U.S. Application Data

(62) Division of application No. 09/836,379, filed on Apr. 17, 2001, now Pat. No. 6,628,459.

(30) Foreign Application Priority Data

| Apr. 19, 2000 | (JP) | 2000-117739 |
| Apr. 19, 2000 | (JP) | 2000-117740 |
| Feb. 28, 2001 | (JP) | 2001-055815 |
| Apr. 9, 2001 | (JP) | 2001-110469 |

(51) Int. Cl.⁷ .............................................. G02B 21/26
(52) U.S. Cl. .................... 359/392; 359/379; 359/554; 359/820
(58) Field of Search ................... 359/368, 379, 359/382, 383, 391, 392, 393, 395, 554, 555, 359/557, 804, 805, 820, 822–826; 250/442.11, 250/201.3; 356/148

(56) References Cited

U.S. PATENT DOCUMENTS

| 5,703,715 A | 12/1997 | Gaul |
| 5,764,409 A | 6/1998 | Colvin |
| 5,978,086 A * | 11/1999 | Aziz et al. .................. 356/511 |
| 6,226,118 B1 | 5/2001 | Koyama et al. |
| 6,437,343 B1 * | 8/2002 | Okazaki et al. ......... 250/442.11 |

FOREIGN PATENT DOCUMENTS

JP 9-120030 A 5/1997

* cited by examiner

*Primary Examiner*—Mark A. Robinson
*Assistant Examiner*—Lee Fineman
(74) *Attorney, Agent, or Firm*—Frishauf, Holtz, Goodman & Chick, P.C.

(57) ABSTRACT

A position adjusting means is provided at an outer periphery of an objective lens opposite to an observation sample and the observation sample is moved by the position adjusting means in an optical axis direction of the objective lens to set a focal point of the objective lens to the observation sample.

9 Claims, 15 Drawing Sheets

FOCUS STABILIZING APPARATUS

CROSS-REFERENCE TO RELATED APPLICATIONS

The present application is a divisional application of U.S. application Ser. No. 09/836,379, filed Apr. 17, 2001 now U.S. Pat. No. 6,628,459 and claims the benefit of priority under 35 USC 119 of Japanese Patent Applications No. 2000-117739 filed Apr. 19, 2000; No. 2000-117740 filed Apr. 19, 2000; No. 2001-055815 filed Feb. 28, 2001; and No. 2001-110469 filed Apr. 9, 2001, the entire contents of all of which are incorporated herein by reference.

BACKGROUND OF THE INVENTION

1. Field of the Invention

The present invention relates to a focus stabilizing apparatus for stabilizing a focused state of an optical apparatus, such as a microscope.

2. Description of the Background Art

Generally, a sample observation is carried out with the use of a microscope. This sample observation is made as follows. An observation sample is placed on a microscope stage and an objective lens is moved closer to the observation sample. By doing so, an observation spot of the observation sample is observed under a magnified state.

In this case, an objective lens has its focal depth decreased as the magnifying power becomes higher. It is, therefore, difficult to achieve a focus setting between the objective lens and the observation sample. Further, if the distance between the objective lens and the observation sample minutely varies, defocusing occurs between the focal point position of the objective lens and the observation sample due to a variation of the minute distance, so that the quality of the observation image is greatly degraded.

On the other hand, an apparent position between the objective lens and the observation sample is very closer to each other. By the way, there exists a mechanical coupling length between the objective lens and the observation sample. This mechanical coupling length is constituted by many mechanical component parts present between the objective lens and the observation sample. The mechanical coupling length is provided by the length over which, for example, a microscope frame, objective lens moving mechanism, objective lens mounting revolver are passed. Therefore, the length is very long because many mechanical components are interposed.

These mechanical component parts are liable to be varied in their dimensions due to a temperature variation involved.

Further, the greater the number of the mechanical component parts the greater the mechanical coupling length involved. The microscope is easily affected by a vibration and the vibration amplitude becomes greater.

If, therefore, the ambient temperature varies due to, for example, the turning ON/OFF of an illumination, internal power supply, etc., as well as the operation of an air conditioning equipment, then there arises a variation in the dimensions of mechanical component parts in the microscope. Even if, therefore, the focal setting of the objective is made relative to the observation sample, the distance between the objective lens and the observation sample greatly varies due to the above-mentioned dimensional variation and there occurs a defocusing.

Further, under a somewhat smaller external vibration, a greater vibration amplitude is involved and a distance between the objective lens and the sample varies, thus resulting in an out-of-focus state.

Heretofore, various kinds of autofocusing mechanisms have been considered to compensate such defocusing. These autofocusing mechanisms require a complex mechanical/electrical mechanism and control system. For this reason, the resultant apparatus becomes bulkier and expensive. Further, another microscope is known in which, like a fluorescent observation, the brightness is extremely darker at a time of observation. To such a microscope it is originally difficult to apply the above-mentioned autofocusing mechanism.

The following technique is disclosed in JPN PAT APPLN KOKAI Publication No. 9-120030. In this technique, a stage is provided through a rack and drive gears and it is driven in the optical axis direction of the objective lens. Between the gears and the stage, at least two rods are inserted. These rods are different in their thermal expansion coefficients and configured such that the direction of the thermal expansion coefficient of one rod acts in a direction opposite to that of the other rod. By doing so, defocusing is compensated.

In such a technique, the rods are arranged within the microscope body and a time is taken until the temperature is compensated under a variation of the ambient temperature. For this reason, there is a risk that, when the sample is observed, its operation, efficiency will be lowered. Further, since the rods are interposed, the mechanical coupling length becomes greater and its structure is liable to be affected from the external vibration. It is, therefore, necessary to remodel the microscope itself.

In the case where a living cell, etc., is observed as a target object, only a periphery side of the observation sample is sometimes warmed by a warmer. However, it is not possible to compensate a temperature drift involved.

BRIEF SUMMARY OF THE INVENTION

It is accordingly the object of the present invention to provide a focus stabilizing apparatus which can make a focus setting of an objective lens relative to an observation sample under a stable way without being adversely influenced from a variation in the ambient temperature.

According to a main aspect of the present invention, a focus stabilizing apparatus is provided which comprises an objective lens arranged opposite to a observation sample, and position adjusting means provided at an outer periphery of the objective lens and adapted to move the observation sample in an optical axis direction to set a focal point of the objective lens to the observation sample.

According to a main aspect of the present invention, a focus stabilizing apparatus is provided which comprises an objective lens arranged opposite to the observation sample, a stage so provided as to be movable in a direction orthogonal to an optical axis of the objective lens, a sample base placed on the stage to retain the observation sample, position adjusting means provided at an outer periphery of the objective lens and adapted to move the observation sample in an optical axis direction through the sample base to set a focal point of the objective lens to the observation sample, and elastic means provided on the stage and so set through the sample base as to have a low rigidity in the optical axis direction of the objective lens and a high rigidity in a moving direction of the stage.

According to a main aspect of the present invention, a focus stabilizing apparatus is provided which comprises an objective lens arranged opposite to an objection lens, a stage so provided as to be movable in a direction orthogonal to an optical axis of the objective lens, a sample base placed on the stage to retain the observation sample, and position adjusting means provided at an outer periphery of the objective lens and adapted to move the observation sample in an optical axis direction of the objective lens through the sample base to set a focal point of the objective lens to the observation sample, wherein the position adjusting means has a fixing base for fixing the objective lens, a sample retaining base for placing the observation sample thereon, and an operation ring threadably inserted over the fixing base and, by being rotated relative to the fixing base, moving in the optical axis direction of the objective lens and moving the sample retaining base in the optical axis direction of the objective lens to adjust a relative distance between the observation sample and the objective lens.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, position adjusting means provided at an outer periphery of the objective lens to move the observation sample in the optical axis direction of the objective lens through the sample base to set a focal point of the objective lens, to the observation sample, and elastic means provided on the stage and so set relative to the sample base as to have a low rigidity in the optical axis direction of the objective lens and a high rigidity in a moving direction of the stage, wherein the position adjusting means has a fixing base for fixing the objective lens, a sample retaining base placing the observation sample thereon, and an operation ring threadably inserted over the fixing base and, by being rotated relative to the fixing base, moving in the moving axis direction of the objective lens and moving the sample retaining base in the optical axis direction of the objective lens to adjust a relative distance between the observation sample and the objective lens.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on a stage to retain the observation sample, and position adjusting means provided at an outer periphery of the objective lens and moving the observation sample in an optical axis direction of the objective lens through the sample base to set a focal point of the objective lens to the observation sample, wherein the position adjusting means has a fixing base for fixing the objective lens, and a sample retaining base placing the observation sample thereon and threadably inserted over the fixing base and, being rotated relative to the fixing base, moving in the optical axis direction of the objective lens.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, position adjusting means provided at an outer periphery of the objective lens and moving the observation sample in an optical axis direction of the objective lens through the sample base to set a focal point of the objective lens to the observation sample, and elastic means provided on the stage and so set relative to the sample base as to have a low rigidity in the optical axis direction of the objective lens and a high rigidity in a moving direction of the stage, wherein the position adjusting means has a fixing base for fixing the objective lens and a sample retaining base placing the observation sample thereon and threadably inserted over the fixing base and, by being rotated relative to the fixing base, moving in the optical axis direction of the objective lens.

In such focus stabilizing apparatus, the objective lens is fixed to the fixing base and threadably inserted directly into a revolver provided at a microscope body.

The position adjusting means has a rotation stop section arranged at the upper side of the sample retaining base, an intermediate seat arranged on the upper side of the rotation stop section and having the observation sample placed thereon, and a pin having one end mounted in the fixing base and the other end inserted through a hole in the rotation stop section and provided parallel to the optical axis direction of the objective lens.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, and position adjusting means provided at an outer periphery of the objective lens and moving the observation sample in an optical axis direction of the objective lens through the sample base to set a focal point of the objective lens to the observation sample, wherein the position adjusting means has a fixing base for fixing the objective lens, a sample retaining base placing the observation sample thereon, fitted over an outer periphery of the fixing base and so provided as to be movable in the optical axis direction of the objective lens, and a friction member situated between the fixing base and the sample retaining base and retaining the sample retaining base by a friction force relative to the fixing base.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain an observation sample, position adjusting means provided on an outer periphery of the objective lens and moving the observation sample in an optical axis direction of the objective lens through the sample base to set a focal point of the objective lens to the observation sample, and elastic means provided on the stage and so set relative to the sample base as to have a low rigidity in the optical axis direction of the objective lens and a high rigidity in a moving direction of the stage, wherein the position adjusting means has a fixing base for fixing the objective lens, a sample retaining base placing the observation sample thereon and fitted over an outer periphery of the fixing base and so provided as to be movable in the optical axis direction of the objective lens, and a friction member situated between the fixing base and the sample retaining base and retaining the sample retaining base by a friction force relative to the fixing base.

In the focus retaining apparatus, a sample retaining base grasping mechanism is provided for grasping and fixing the sample retaining base.

Further, a temperature sensor is provided on the fixing base to detect the ambient temperature and a temperature adjusting means is provided for adjusting the temperature of the fixing base and sample retaining base on the basis of a detection output of the temperature sensor to be made constant at all times.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, and position adjusting means provided at an outer periphery of the objective lens and moving the observation sample in an optical axis direction of the objective lens through the sample base to set a focal point of the objective lens to the observation sample, wherein the position adjusting means has a fixing base for fixing the objective lens, a sample retaining base fitted over an outer periphery of the fixing base and so provided as to be movable in the optical axis direction of the objective lens, a piezoelectric actuator provided on the upper side of the sample retaining base and performing its extending/contracting operation in the optical axis direction of the objective lens, a sample base provided on the upper side of the piezoelectric actuator and placing the observation sample thereon and an electrostatic sensor provided on the upper side of the sample retaining base to detect a moving amount of the sample base.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, position adjusting means provided at an outer periphery of the objective lens and moving the observation sample in an optical axis direction of the objective lens through the sample base to set a focal point of the objective lens to the observation sample, and elastic means provided on the stage and so set relative to the sample base as to have a low rigidity in the optical axis direction of the objective lens and a high rigidity in a moving direction of the stage, wherein the position adjusting means has a fixing base for fixing the objective lens, a sample retaining base fitted over an outer periphery of the fixing base and so provided as to be movable in the optical axis direction of the objective lens, a piezoelectric actuator provided on the upper side of the sample retaining base and performing its extending/contracting operation in the optical axis direction of the objective lens, a sample base provided on the upper side of the piezoelectric actuator and placing the observation sample thereon, and an electrostatic sensor provided on the upper side of the sample retaining base to detect a moving amount of the sample base.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, and position adjusting means provided at an outer periphery of the objective lens and moving the observation sample in an optical axis direction of the objective lens through the sample base to set a focal point of the objective lens to the observation sample, wherein the position adjusting means has a fixing base for fixing the objective lens and having a flange at its outer periphery and a sample retaining base fitted over an outer periphery of the fixing base and so provided as to be movable in the optical axis direction of the objective lens and having a flange at its outer periphery, and a feed screw section provided between the flange of the fixing base and the flange of the sample retaining base to feed the sample retaining base in the optical axis direction of the objective lens relative to the fixing base.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation stage, position adjusting means provided at an outer periphery of the objective lens and moving the observation sample in an optical axis direction of the objective lens through the sample base to set a focal point of the objective lens to the observation sample, and elastic means provided on the stage and so set relative to the sample base as to have a low rigidity in the optical axis direction of the objective lens and a high rigidity in a moving direction of the stage, wherein the position adjusting means has a fixing base for fixing the objective lens and having a flange at its outer periphery, a sample retaining base fitted over the outer periphery of the fixing base and so provided as to be movable in the optical axis direction of the objective lens and having a flange at its outer periphery, and a feed screw section provided between the flange of the fixing base and the flange of the sample retaining base to feed the sample retaining base in the optical axis direction of the objective lens relative to the fixing base.

In the focus stabilizing apparatus, leaf springs are provided on the sample retaining base to fix the observation sample thereon.

Further, a mechanical coupling length between the objective lens and observation sample is set by the fixing base, sample retaining base and operation ring.

A mechanical coupling length between the objective lens and the observation sample is set by the fixing base and the sample retaining base.

In the focus stabilizing apparatus, the fixing base, operation ring and sample retaining base are made of at least two different kinds of materials and selectable in their dimensions.

The operation ring and sample retaining base are made of at least two different kinds of materials and selectable in their dimensions.

The operation ring and sample retaining base are formed of materials of different linear expansion coefficients.

An auxiliary member is located between the operation ring and the sample retaining base and made of a material different in liner expansion coefficient from the materials of the operation ring and sample retaining base.

The elastic means is comprised of leaf springs provided on the stage and arranged along the direction orthogonal to the optical axis of the objective lens and a magnet provided on the leaf spring to attract the sample base.

According to a main aspect of the present invention, a focus stabilizing apparatus is provided which comprises an objective lens arranged opposite to an observation sample, position adjusting means provided at an outer periphery of the objective lens and moving the observation sample in an optical axis direction of the objective lens to set a focal point of the objective lens to the observation sample, a minute movement mechanism for minutely displacing the objective lens in the optical axis direction of the objective lens, displacement amount detecting means for detecting a displacement amount of the objective lens, and control means for operating the minute movement mechanism on the basis of a detection output of the displacement amount detecting means to control a relative distance between the objective lens and the observation sample to a predetermined distance.

According to a main aspect of the present invention, a focus stabilizing apparatus is provided which comprises an objective lens arranged opposite to an observation sample, a stage so provided as to be movable in a direction orthogonal to an optical axis of the objective lens, a sample base placed on the stage to retain the observation sample, position adjusting means provided at an outer periphery of the objective lens and moving the observation sample in an optical axis direction of the objective lens through the sample base to set a focal point of the objective lens to the observation sample, a minute movement mechanism for minutely displacing the objective lens in the optical axis direction of the objective lens, displacement amount detecting means for detecting a displacement amount of the objective lens, control means for operating the minute movement mechanism on the basis of a detection output of the displacement amount detecting means to control a relative distance between the objective lens and the observation sample to a predetermined distance, and elastic means provided on the stage and so set relative to the sample base as to have a low rigidity in the optical axis direction of the objective lens and a high rigidity in a moving direction of the stage.

In the focus stabilizing apparatus, the position adjusting means has a fixing base for fixing the objective lens through the minute movement mechanism, a sample retaining base for placing the observation sample thereon, and an operation ring threadably inserted over the fixing base and, by being rotated relative to the fixing base, moving in the optical axis direction of the objective lens and moving the sample retaining base in the optical axis direction of the objective lens to adjust a relative distance between the observation sample and the objective lens.

A mechanical coupling length between the objective lens and the observation sample is set by the fixing base for fixing the objective lens through the minute movement mechanism, the sample retaining base for placing the observation sample thereon and the operation ring inserted over the fixing base and, by being rotated relative to the fixing base, moving in the optical axis direction of the objective lens and moving the sample retaining base in the optical axis direction of the objective lens to adjust a relative distance between the observation sample and the objective lens.

The minute movement mechanism has a moving stage relative to which the objective lens is provided, and an actuator for minutely moving the moving stage in the optical axis direction of the objective lens.

The minute movement mechanism has a moving stage relative to which the objective lens is provided, and piezoelectric actuators arranged in those positions symmetric relative to the optical axis of the objective lens to minutely move the moving stage in the optical axis direction of the objective lens.

The displacement amount detecting means is comprised of an electrostatic capacity sensor.

The control means has means for receiving, as inputs, an objective lens displacement amount detected by the displacement amount detecting means and an instruction value representing the position of the objective lens, means for finding a deviation between the displacement amount of the objective lens and the instruction value, and means for performing operation control of the minute movement mechanism in accordance with the deviation to move the objective lens to a position designated by the instruction value.

The elastic means is comprised of leaf springs mounted on the stage and arranged along the direction orthogonal to the optical axis of the objective lens and a magnet mounted on the leaf spring to attract the sample base.

According to a main aspect of the present invention, a focus stabilizing apparatus is provided which comprises an objective lens arranged opposite to an observation sample, a minute movement mechanism for minutely displacing the objective lens in the optical axis direction of the objective lens, displacement amount detecting means for detecting a displacement amount of the objective lens, and control means for operating the minute movement mechanism on the basis of a detection output of the displacement amount detecting means to control a relative distance between the objective lens and the observation sample to a predetermined distance.

According to a main aspect of the present invention, a focus stabilizing apparatus is provided which comprises an objective lens arranged opposite to an observation sample, a fixing base for fixing the objective lens, a minute movement table on which the objective lens is provided, parallel springs situated between the fixing base and the minute movement table to allow the minute movement table to be moved in an optical axis direction of the objective lens, an actuator provided between the fixing base and the minute movement table to minutely displace the minute movement table in the optical axis direction of the objective lens, a displacement sensor for detecting a displacement amount of the objective lens, and control means for allowing the actuator to perform its extending/contracting operation on the basis of a detection output of the displacement sensor to control the objective lens and bring it to a just-in-focus position relative to the observation sample.

In the focus stabilizing apparatus, the control means has a memory section for storing an output of the displacement sensor corresponding to a just-in-focus state between the observation sample and the objective lens, a comparing section for comparing an output of the displacement sensor and an output of the displacement sensor stored in the memory section, and a control section for outputting an electric signal for canceling a distance variation between the observation sample and the objective lens on the basis of a result of comparison by the comparing section to the actuator.

According to a main aspect of the present invention, a focus stabilizing apparatus is provided which comprises an objective lens arranged opposite to an observation sample, position adjusting means provided at an outer periphery of the objective lens and moving the observation sample in an optical axis direction of the objective lens to set a focal point of the objective lens to the observation sample, a minute movement mechanism for minutely varying a distance between the observation sample and the objective lens in the optical axis direction, and control means for operating the minute movement mechanism to make a fine adjustment of the distance between the observation sample and the objective lens.

According to a main aspect of the present invention, a focus stabilizing apparatus is provided which comprises a fixing base having an objective lens mounting section, a sample base for supporting an observation sample, and position adjusting means provided on the fixing base to allow the sample base to be moved in an optical axis direction of the objective lens.

In the focus stabilizing apparatus, the position adjusting means has a fixing base for fixing the objective lens, an operation ring inserted over the fixing base and, by being rotated, moving in the optical axis direction of the objective lens, and a sample retaining base so provided as to be movable in the optical axis direction and, upon a rotation operation of the operating ring, adjusting a distance between the observation sample and the objective lens.

According to the present invention, the mechanical coupling length between the objective lens and the observation sample is determined by only the position adjusting means provided relative to the objective lens and can be set to be very short. By doing so, there is almost no variation in a positional relation between the objective lens and the observation sample even if the ambient temperature varies. The structure suffers no adverse effect from an external vibration and the sample can be observed at all times under a stable condition.

After the focal point of the objective lens has been set to the observation sample, the observation sample can be moved in a direction orthogonal to the optical axis of the objective lens simply by moving the stage and it is also possible to readily position the observation sample in a moving direction of the stage.

Further, as the position adjusting means use is made of at least two different kinds of materials and its component elements are selectable in their materials and dimensions. It is, therefore, possible to prevent an observation image from being degraded even if the ambient temperature varies.

Further, the mechanical coupling length between the objective lens and the observation sample is set to be short and the operation of the minute movement mechanism is controlled in accordance with a deviation between the displacement amount of the objective lens and the instruction value to allow the objective lens to be set to a position designated by the instruction value. Therefore, even if the ambient temperature varies, there is almost no variation in positional relation between the objective lens and the observation sample. The structure also suffers no adverse effect from external vibrations and the objective lens can be set to a desired position given by the instruction value and the observation sample can be observed, under a stable way, over an extended period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will be described below with reference to the drawings.

Figure 1:
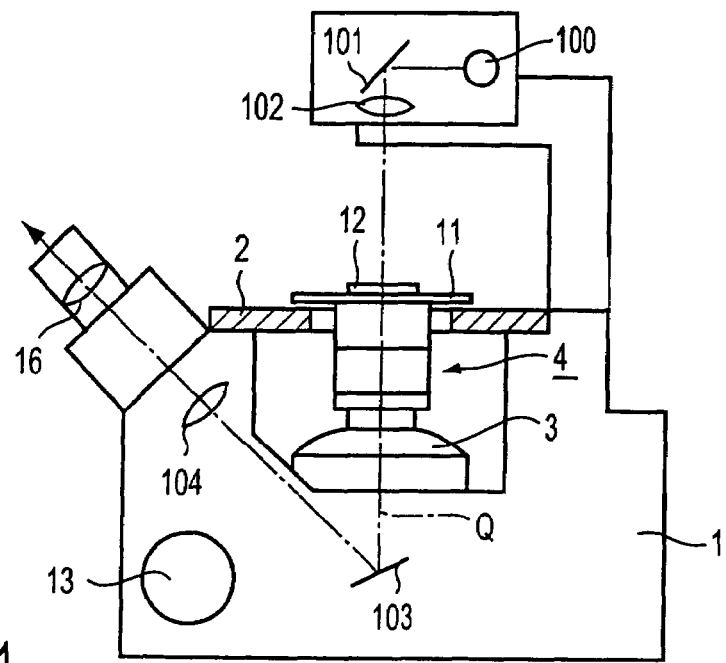
FIG. 1 is a view showing a structure of an inverted type microscope with a focus stabilizing apparatus of a first embodiment of the present invention applied thereto.

FIG. 1 is a diagrammatic view showing an inverted type microscope with a focus stabilizing apparatus of the present invention applied thereto in which a stage 2 is provided on a microscope body 1. Below the stage 2 a revolver 3 is arranged. The focus stabilizing apparatus 4 is provided on the revolver 3.

An explanation will be made below about an observation optical system of the inverted type microscope. A mirror 101 is arranged on an optical path of illumination light which is outputted from a light source 100. A condensing lens 102 is arranged on a reflection optical path. This condensing lens 102 allows the illumination light to condense on a slide glass (sample). A mirror 103 is arranged on an optical path Q of an objective lens 6 within the microscope body 1. Through a relay lens 104 an eyepiece 16 is provided on the reflection optical path of the mirror 103.

Figure 2:
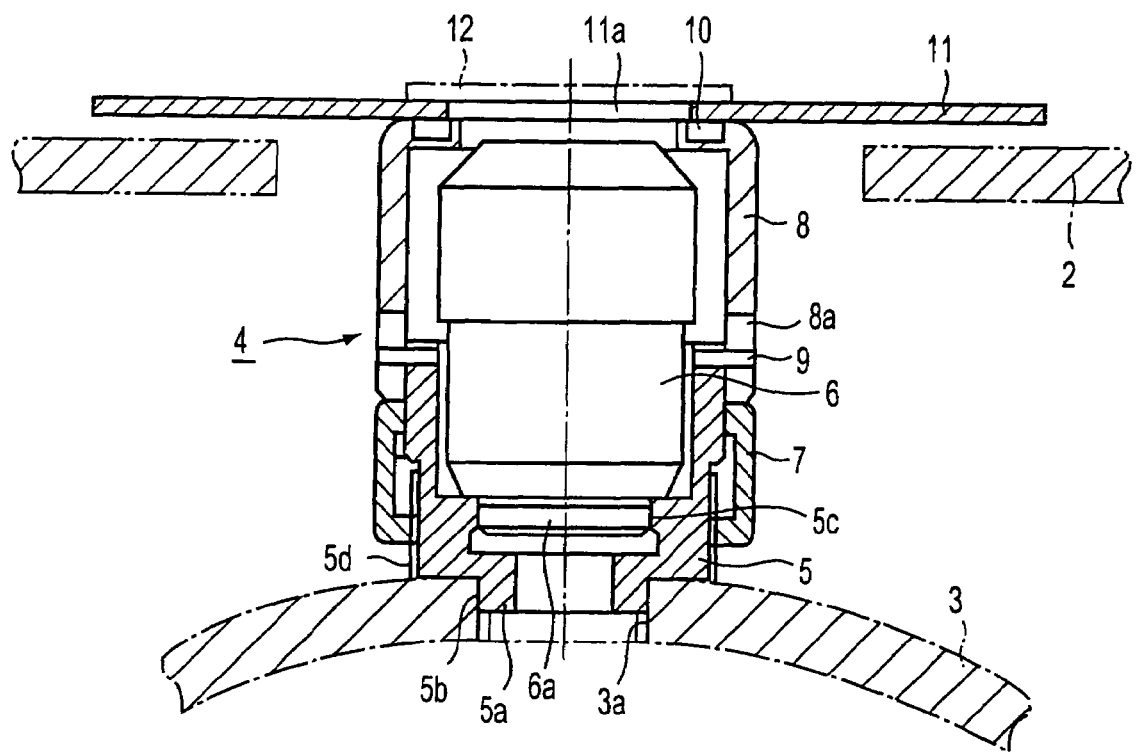
FIG. 2 is a schematic view showing the focus stabilizing apparatus above.

FIG. 2 is a view showing a structure of the focus stabilizing apparatus 4. As a position adjusting means there are a fixing base 5, an operation ring 7 and a sample retaining base 8. The fixing base 5 has a cylindrical configuration and has a small diameter section 5a on one open end side. An objective threaded section 5b is provided on the peripheral surface of the small diameter section 5a. The objective threaded section 5b is threadably inserted into an objective mount hole 3a of the revolver 3.

A threaded section 5c is provided on the inner wall surface of the one open end portion of the fixing base 5. An objective screw 6a of the objective lens 6 is threadably inserted into the threaded section 5c. In this state, the objective lens 6 is integrally fixed along an axis of a hollow section of the fixing base 5.

A threaded section 5d is provided on the outer peripheral surface of the fixing base 5. One open end portion of the cylindrical operation ring 7 is threaded over the threaded section 5d. When the operation ring 7 is rotationally operated, the operation ring 7 as a whole is movable along the threaded section 5d, that is, along a direction of the optical axis Q of the objective lens 6.

One open end of the cylindrical sample retaining base 8 is arranged in an abutting relation to the operation ring 7. A guide hole 8a is provided in the sample retaining base 8 along a moving direction of the operation ring 7. A rotation stop pin 9 is provided on the fixing base 5 side and inserted through the corresponding guide hole 8a.

When, therefore, the operation ring 7 is rotationally operated, the operation ring 7 is moved along the direction of the optical axis Q of the objective lens 6. With the up/down movement of the operation ring 7, the sample retaining base 8, while being guided in the guide hole 8a, is moved only along the direction of the optical axis of the objective lens 6.

The other open end portion of the sample retaining base 8 is bent in the direction of the center axis and a magnet 10 is provided at that bent portion 8b.

A sample base 11 formed of a magnetic attraction stainless steel is arranged to allow it to be attracted to the magnet 10. The sample base 11 has an observation hole 11a formed in a position corresponding to the optical axis Q of the objective lens 6. The slide glass (sample) 12 is placed over the observation hole 11a.

It is to be noted that there is the stage 2 on the microscope body 1 side.

In FIG. 1, a focus setting handle 13 is provided at the microscope body 1 and, by being rotationally operated, enables the focus stabilizing apparatus-mounted revolver 3 to be moved in the up/down direction.

The slide glass (observation sample) 12 is placed on the sample base 11 of the focus stabilizing apparatus 4. An observation image of the slide glass (observation sample) 12 is projected through the objective lens 6 onto the above-mentioned observation optical system to allow it to be observed by the eyepiece 16.

Now, an explanation will be made below about the operation of the embodiment thus arranged.

A plurality of focus stabilizing devices 4 are provided on the revolver 3 and have a different magnifying power each.

First, the focus setting handle 13 is operated to allow the revolver 3 to be moved in a downward direction. By doing so, the revolver 3 is rotated to locate the focus stabilizing device 4 with an objective lens 6 of a desired magnifying power onto the optical path.

It is to be noted that, in a state in which the revolver 3 is moved in a downward direction, the sample base 11 is free from the magnetic attraction of the magnet 10 on the sample retaining base 8. By doing so, the sample base 11 is away from the focus stabilizing device 4 and is left on the stage 2 of the microscope body 2.

Then the focus setting handle 13 is operated to move the revolver 3 in an upward direction. With this, the focus stabilizing device 4 located on the optical path is moved in the upward direction to allow the sample base 11 to be attracted to the magnet 10 on the sample retaining base 8.

Then the operation ring 7 is rotationally operated to allow a positional alignment to be achieved between the slide glass (sample) 12 and the focal point of the objective lens 6. If, in this case, the operation ring 7 is rotated, it is moved, along the direction of the optical axis Q of the objective lens 6, in a "pitch" unit of the screw-threaded section 5d of the fixing base 5. With the movement of the operation ring 7, the sample retaining base 8, being guided in the guide hole 8a, is moved in the direction of the optical axis Q of the objective lens 6.

By doing so, the sample base 11 attracted by the magnet 10 to the sample retaining base 8 is moved together with the sample retaining base 8, thus varying a relative positional relation between the slide glass (sample) 12 and the objective lens 6. As a result, a focal setting is achieved between the slide glass (sample) 12 and the objective lens 6.

With the focal setting state between the slide glass (sample) 12 and objective lens 6, an observation image of the slide glass (sample) 12 is projected through the objective lens 6 onto the observation optical system in the microscope body 1. By doing so, the observation image of the slide glass (sample) 12 is observed with the use of the eyepiece 16.

Thus, the mechanical coupling length between the objective lens 6 and the slide glass (sample) 12 is determined only by the fixing base 5, operation ring 7 and sample retaining base 8 serving as a position adjusting means and can be set to be very short. In the state in which the operation ring 7 is rotationally operated to achieve a positional alignment between the slide glass (sample) 12 and the focal point of the objective lens 6, there occurs almost no variation in the positional alignment therebetween even if the ambient temperature varies. Further, it suffers no adverse influence even from an external vibration, thus ensuring a stable sample observation at all times.

By the way, if, as the material of the fixing base 5 and sample retaining base 8, use is made of the same material as that of a metal component part constituting the objective lens 6 or a material (for example, brass) having a slightly smaller linear expansion coefficient, even when there occurs an ambient temperature variation, the dimensional variation of the objective lens 6 and those of the fixing base 5 and sample retaining base 8 can be made substantially equal to each other, thus minimizing the relative positional variation between the sample and the objective lens.

Further, the smaller the pitch of the screw threaded section 5*d* of the fixing base 5, it is possible to make the amount of relative movement of the sample retaining base 8 in the optical axis direction smaller by the rotational operation of the operation ring 7 and, in the case of using an objective lens 6 of a higher magnifying power, an easier positional alignment can be achieved between the sample and the focal point of the objective lens if the pitch of the screw-threaded section 5*d* is made smaller.

A second embodiment of the present invention will now be explained below.

Figure 3:
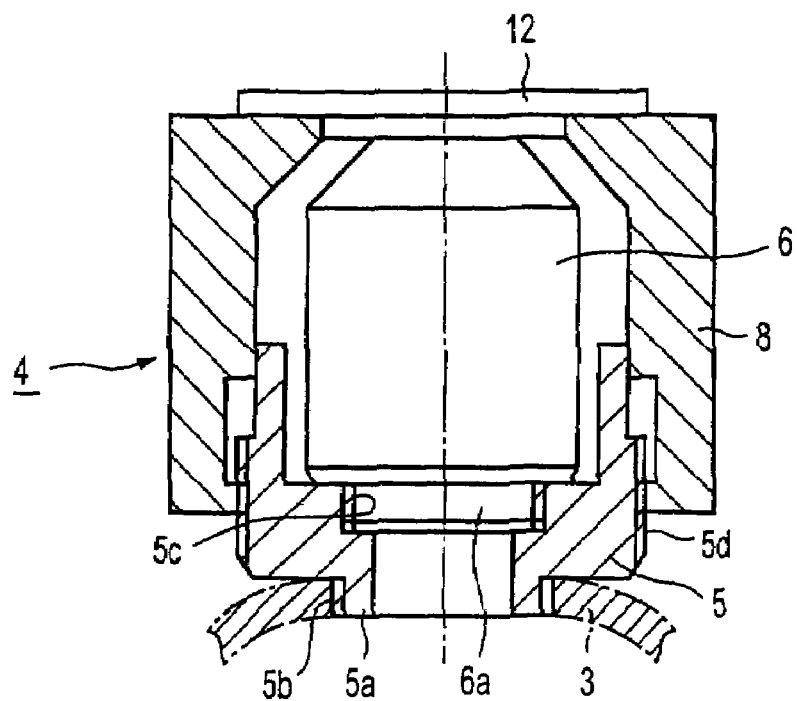
FIG. 3 is a schematic view showing a focus stabilizing apparatus of a second embodiment of the present invention.

FIG. 3 shows a view showing a structure of the second embodiment of the present invention, noting that the same reference numerals are employed to designate parts or elements corresponding to those shown in FIG. 2.

In this apparatus, the operation ring 7 shown in FIG. 2 is omitted and one open end portion of a cylindrical sample retaining base 8 is threadably inserted over a threaded section 5*d* of the fixing base 5. By doing so, when the sample retaining base 8 is rotationally operated, the base 8 as a whole is moved along the threaded section 5*d*, that is, along a direction of an optical axis Q of an objective lens 6.

According to such second embodiment, it is possible to obtain the same advantage as in the first embodiment and, since the number of component parts involved can be decreased, to obtain a simpler structure at a lower cost.

Then an explanation will be made below about a third embodiment of the present invention.

Figure 4:
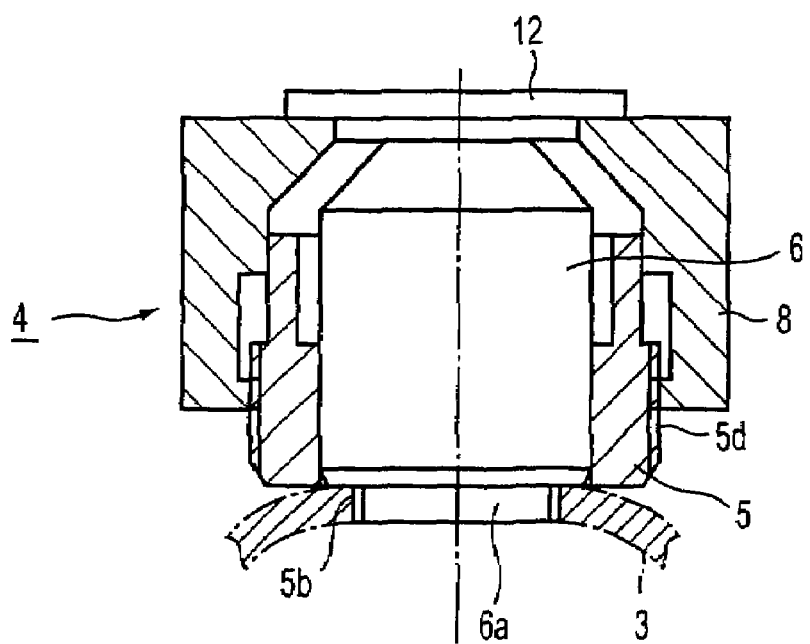
FIG. 4 is a schematic view showing a focus stabilizing apparatus of a third embodiment of the present invention.

FIG. 4 is a view showing a structure of the third embodiment of the present invention, noting that the same reference numerals are employed to designate parts or elements corresponding to those shown in FIG. 3.

In this apparatus, an objective lens 6 is fixed to a fixing base 5 and an objective threaded section 6*a* of the objective lens 6 is threadably inserted into an objective mount hole 3*a* in a revolver 3.

According to the third embodiment as set out above, it is possible to obtain the same advantage as in the first embodiment. Since the objective threaded section 6*a* of the objective lens 6 is threadably inserted directly into the objective mount hole 3*a* in the revolver 3, it is possible to make an easier height adjustment of the objective lens 6 without involving a variation in height level of the objective lens 6.

Further, since it is not necessary to provide any threaded section for fixing the objective lens 6 to the fixing base 5 and any threaded section for being fixed to the revolver 3, it is possible to obtain a simpler structure at a lower cost.

Then a fourth embodiment of the present invention will be explained below.

Figure 5:
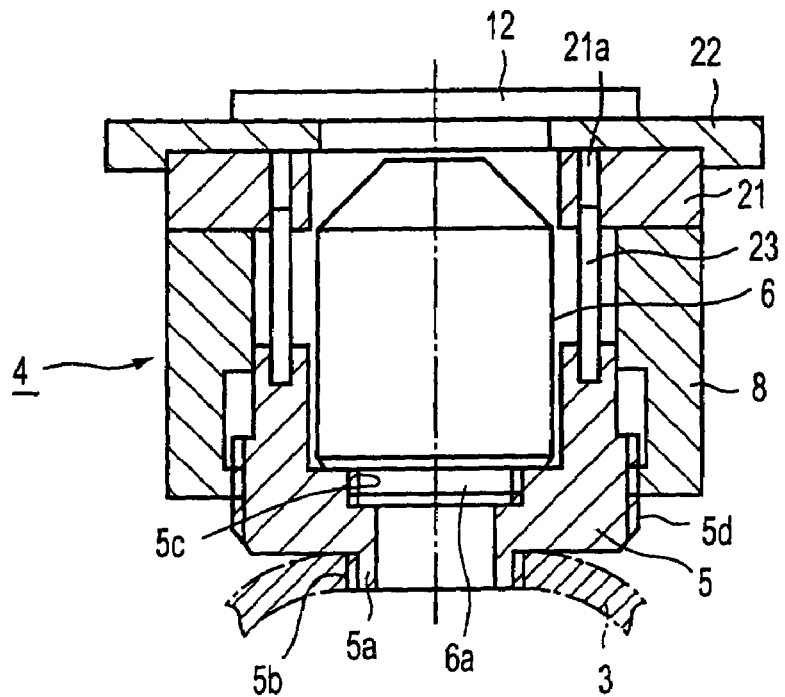
FIG. 5 is a schematic view showing a focus stabilizing apparatus of a fourth embodiment of the present invention.

FIG. 5 is a view showing a structure of the fourth embodiment of the present invention, noting that the same reference numerals are employed to designate parts or elements corresponding to those shown in FIG. 3.

A ring-like rotation stop section 21 is disposed on the upper side of a sample retaining base 8 and a disk-like annular intermediate seat 22 is disposed on the upper side of the rotation stop section 21. Pins 23 are provided in a fixing base 5 in a vertical direction. The forward end portion of the pin 23 is inserted into a corresponding hole 21*a* in the rotation stop section 21.

Thus, when the sample retaining base 8 is rotationally operated, the base 8 as a whole is moved along a threaded section 5*d* and, with this movement, the rotation stop section 21 is moved along a direction of an optical axis of an objective lens 6.

In this structure, it is possible to achieve a positional setting between a slide glass (sample) 12 and the focal point of the objective lens 6 by rotationally operating the sample retaining base 8. That is, when the sample retaining base 8 is rotated, the base 8 is moved, in a "pitch" unit of the screw-threaded section 5*d* of the fixing base 5, along the direction of the optical axis of the objective lens 6. With the movement of the sample retaining base 8, the rotation stop section 21, while being guided by the pins 23, is moved in the direction of the optical axis Q of the objective lens 6. By doing so, the intermediate seat 22 on the rotation stop section 21 is moved with the rotation stop section 21, so that the relative positional relation between the slide glass (sample) 12 and the objective lens 6 varies to achieve an alignment between the slide glass (sample) 12 and the focal point of the objective lens 6.

According to such fourth embodiment, therefore, it is possible to obtain the same advantage as in the first embodiment. In addition, the intermediate seat 22 is rotatable relative to the rotation stop section 21 and, by rotating the intermediate seat 22, it is possible to rotate the slide glass (sample) 12 in any given direction.

Then a fifth embodiment of the present invention will be explained below.

Figure 6:
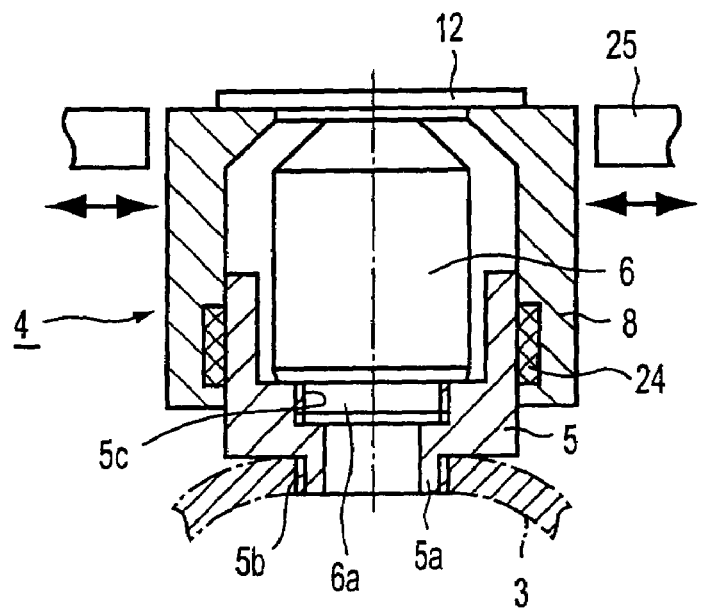
FIG. 6 is a schematic view showing a focus stabilizing apparatus of a fifth embodiment of the present invention.
Figure 7:
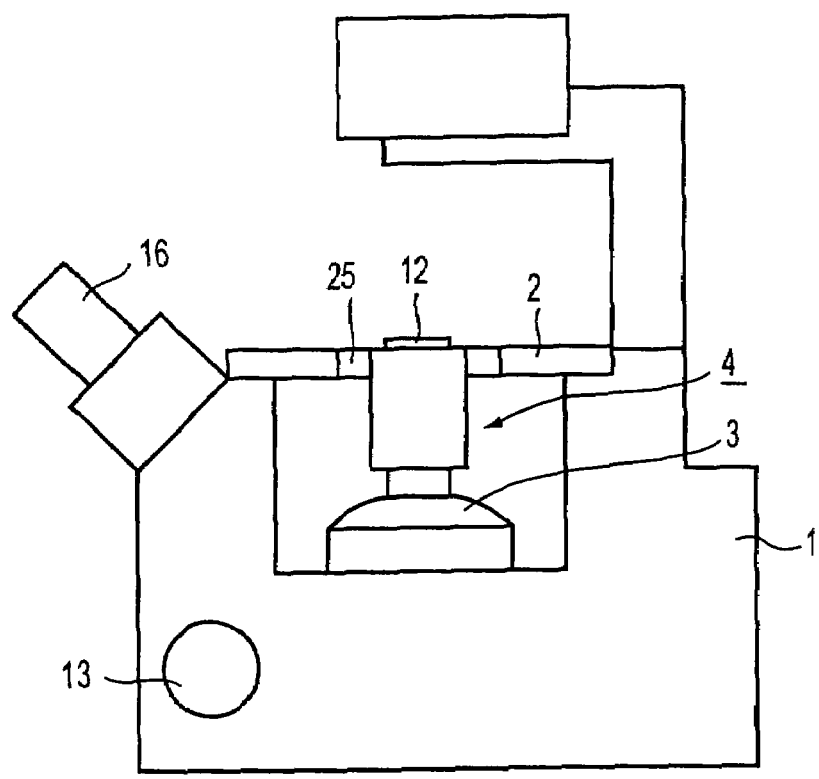
FIG. 7 is a schematic view of a microscope with the focus stabilizing apparatus applied thereto.

FIGS. 6 and 7 are views showing a structure of the fifth embodiment of the present invention, noting that the same reference numerals are employed to designate parts or elements corresponding to those shown in FIGS. 3 and 1. An optical system of its inverted type microscope is the same as in FIG. 1 and it is omitted here for brevity's sake.

The outer periphery of a fixing base 5 is fitted in the inner wall of a sample retaining base 8. In that fitted area, a friction member 24 is interposed and, hence, the sample retaining base 8 is retained by a frictional force of the friction member 24.

A sample retaining base grasping mechanism 25 is provided at a stage 2 of a microscope body 1 and it grasps and fixes the sample retaining base 8 as required. The fixing force of the sample retaining base grasping mechanism 25 is set to be greater than the friction force of the friction member 24.

In the structure thus arranged, a positional setting is done between a slide glass (sample) 12 and a focal point of an objective lens 6 by firstly grasping and fixing the sample retaining base 8 by means of the sample retaining base grasping mechanism 25. In this state, a focus setting handle 13 is operated and, by doing so, the fixing base 5 together with a revolver 3 is moved in a direction of an optical axis Q of the objective lens 6.

Since, at this time, the fixing force of the sample retaining base 8 is greater than the frictional force of the friction member 24, it follows that, by the operation of the focus setting handle 13, the sample retaining base 8 is not moved and only the fixing base 5 is moved. And a relative positional relation between the slide glass (sample) 12 and the objective lens 6 is varied to allow a setting to be achieved between the slide glass (sample) 12 and the focal point of the objective lens 6. After this focus setting, the sample retaining base grasping mechanism 25 releases the fixing of the sample retaining base 8.

According to the above-mentioned fifth embodiment, it is possible to obtain the same advantage as in the first embodiment and, in addition, also to ensure a readier manufacture and assembly since it is not necessary to provide any threaded sections for which an accuracy is required.

Then the sixth embodiment of the present invention will be explained below.

Figure 8:
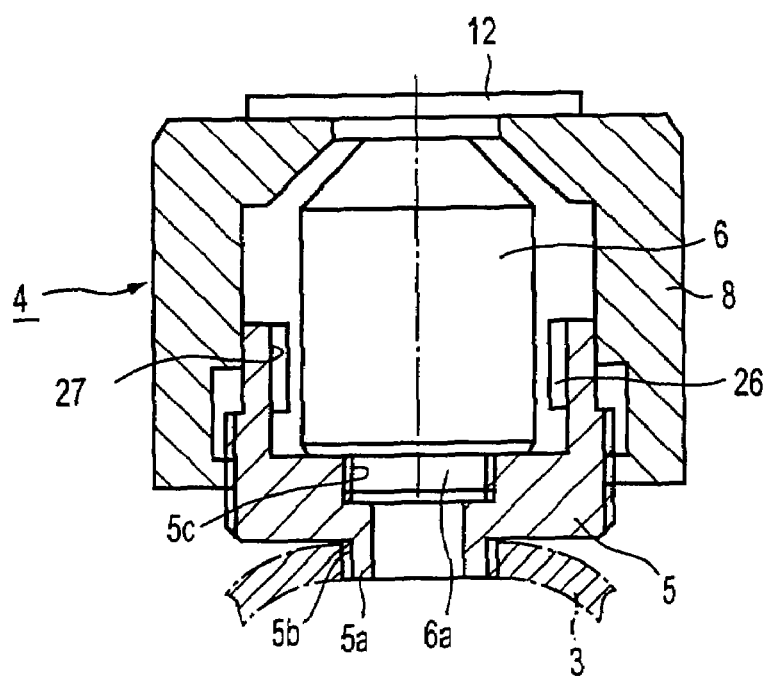
FIG. 8 is a schematic view showing a focus stabilizing apparatus of a sixth embodiment of the present invention.

FIG. 8 is a view showing a structure of the sixth embodiment of the present invention, noting that the same reference numerals are employed to designate parts or elements corresponding to those shown in FIG. 3.

Inside the fixing base 5 there are arranged a temperature sensor 26 and temperature adjusting device 27. The temperature sensor 26 detects the ambient temperature and outputs its detection signal. The temperature adjusting device 27 receives the detection signal outputted from the temperature sensor 26 and adjusts the temperatures of a fixing base 5 and sample retaining base 8 in accordance with a variation of the ambient temperature to be made at all times constant.

In such structure, if a temperature variation occurs at the sample retaining base 8 due to the variation of the ambient temperature, a temperature difference is created relative to an objective lens 6. Then only the sample retaining base 8 suffers a dimensional variation to sometimes produce a positional displacement between a sample and the focal point of the objective lens 6.

At this time, the temperature sensor 26 detects the ambient temperature and outputs its detection signal. The temperature adjusting device 27 receives the detection signal outputted from the temperature sensor 26 and performs an adjustment in accordance with the variation of the ambient temperature to make the temperatures of the fixing base 5 and sample retaining base 8 at all times constant.

By doing so it is possible to, even in the case of an ambient temperature variation, prevent a positional displacement between the slide glass (sample) 12 and the focal point of the objective lens 6 and to make observation at all times under a stable condition on the microscope.

In the case where an observation target (sample) is a living cell, etc., then it is warmed by a temperature warmer. However, a problem arises that heat is taken away by the objective lens 6. By providing the above-mentioned temperature sensor 26 and temperature adjusting device 27, however, it is possible to warm the sample retaining base 8 to the same temperature level as that of the temperature warmer and to avoid the problem that heat is taken away by the objective lens 6.

An explanation will be made below about a seventh embodiment of the present invention.

Figure 9:
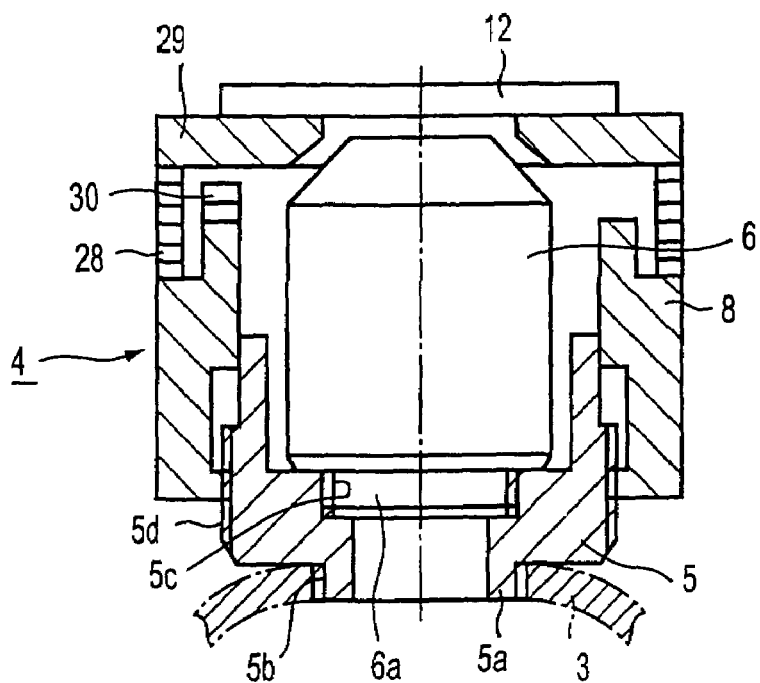
FIG. 9 is a schematic view showing a focus stabilizing apparatus of a seventh embodiment of the present invention.

FIG. 9 is a view showing a structure of the seventh embodiment of the present invention, noting that the same reference numerals are employed to designate parts or elements corresponding to those shown in FIG. 3.

A sample base 29 is placed over a sample retaining base 8 through a piezoelectric actuator 28. A slide glass (sample) 12 is placed on the sample base 29 and an electrostatic capacity sensor 30 is provided on the sample retaining base 8 and it measures an amount of movement of the sample base 29.

In the structure thus arranged, the sample base 29 is minutely moved in a direction of an optical axis Q of an objective lens 6 by driving the piezoelectric actuator 28. At this time, the amount of movement of the sample base 29 is detected by the electrostatic capacity sensor 30.

There are sometimes the cases where the slide glass (sample) 12 has a height in an optical axis Q direction. In this case, the sample base 29 is moved in the optical axis Q direction and, by doing so, it is possible to observe any height level on the sample.

If use is made of a scannable laser beam introducing means for the objective lens 6, it can be utilized also as a laser scan type microscope. At this time, it is possible to realize a measurement less likely to be affected by an external vibration and ambient temperature variation.

An explanation will be made about an eighth embodiment of the present invention.

Figure 10:
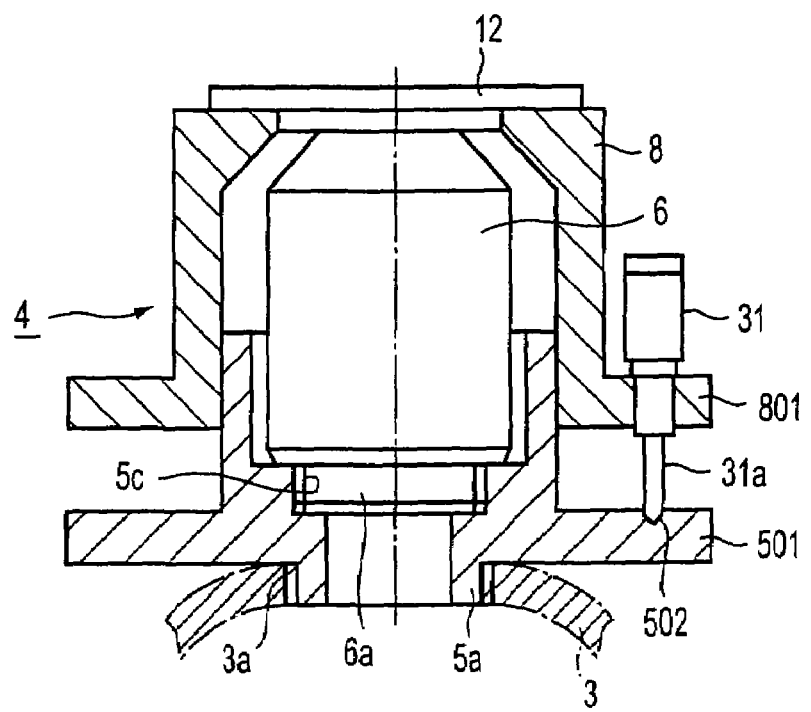
FIG. 10 is a schematic view showing a focus stabilizing apparatus of an eighth embodiment of the present invention.

FIG. 10 is a view showing an eighth embodiment of the present invention, noting that the same reference numerals are employed to designate parts or elements corresponding to those shown in FIG. 3.

The inner wall of a sample retaining base 8 is fitted over the outer periphery of a fixing base 5. The sample retaining base 8 can be moved smoothly in an optical axis Q direction of an objective lens 6. A flange 501 is provided at the fixing base 5 and a flange 801 is formed on the sample retaining base 8 to correspond to the flange 501 of the fixing base 5.

A feed screw section 31 is provided at the flange 801 of the sample retaining base 8. The feed screw section 31 has a feed shaft 31a which allows a minute feed to be achieved as in the case of, for example, a micrometer head. A forward end of the feed shaft 31a is set in contact with a recess 502 in the flange 501.

In the structure thus arranged, a positional setting is achieved between a slide glass (sample) 12 and a focal point of the objective lens 6 by, firstly, rotating the feed screw section 31. This causes the forward end of the feed shaft 31a to push the flange 501 of the fixing base 5, so that the sample retaining base 8 is moved.

Since, at this time, the position of the feed screw section 31 is restricted by the recess 502 in the flange 501, the sample retaining base 8 produces no rotation operation and the sample retaining base 8 is moved only in an optical axis Q direction of the objective lens 6.

By doing so, the relative positional relation between the slide glass (sample) 12 and the objective lens varies, thus achieving an alignment between the slide glass and the focal point of the objective lens 6.

By the use of such feed screw section 31 it is possible to achieve a very minute optical axis Q direction positional setting without rotating an observation sample side. Even if, for example, use is made of an objective lens of a high magnifying power, it is possible to easily achieve a focus setting.

Then an explanation will be made below about a ninth embodiment of the present invention.

Figure 11:
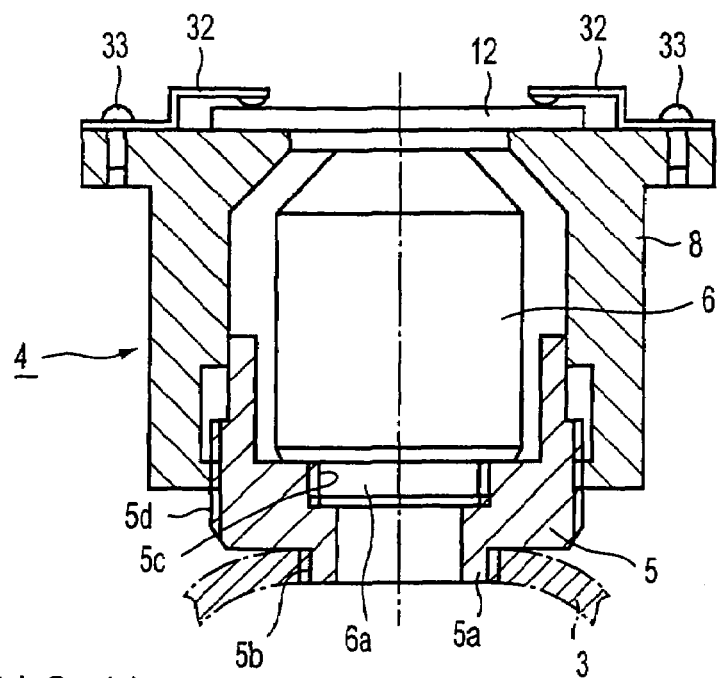
FIG. 11 is a schematic view showing a focus stabilizing apparatus of a ninth embodiment of the present invention.

FIG. 11 is a view showing a structure of the ninth embodiment of the present invention, noting that the same reference numerals are employed to designate parts or elements corresponding to those shown in FIG. 3.

Leaf springs 32 are set by screws 33 in a sample retaining base 8. The leaf springs 32 fixes a slide glass (sample) 12 in place on the sample retaining base 8.

By doing so, an added stability can be achieved against an external vibration since the slide glass (sample) 12 is fixed in place on the sample retaining base 8.

Since the positional relation between the sample and an objective lens 6 can be maintained in a stable way even if this positional relation is set upside down or downside up, the present invention can be applied to an erect type microscope.

It is to be noted that the leaf spring 32 may be fixed to a stage 2 of the microscope body 1 shown in FIG. 1. If this is so done even in the case where the rotation stop section 21 and intermediate seat 22 are separated as set out in the fourth embodiment, it is possible to retain them in-place on the stage 2 in a stable way.

Then an explanation will be made below about a tenth embodiment of the present invention.

Although, in the above-mentioned respective embodiment, the sample retaining base 8 is moved in the optical axis Q direction of the objective lens 6, it is also necessary to position the slide glass (sample) 12 in a direction orthogonal to the optical axis Q of the objective lens 6, that is, in an XY direction corresponding to a moving direction of the stage 2.

The tenth embodiment can position a sample in a XY direction corresponding to a moving direction of a stage 2.

Figure 12:
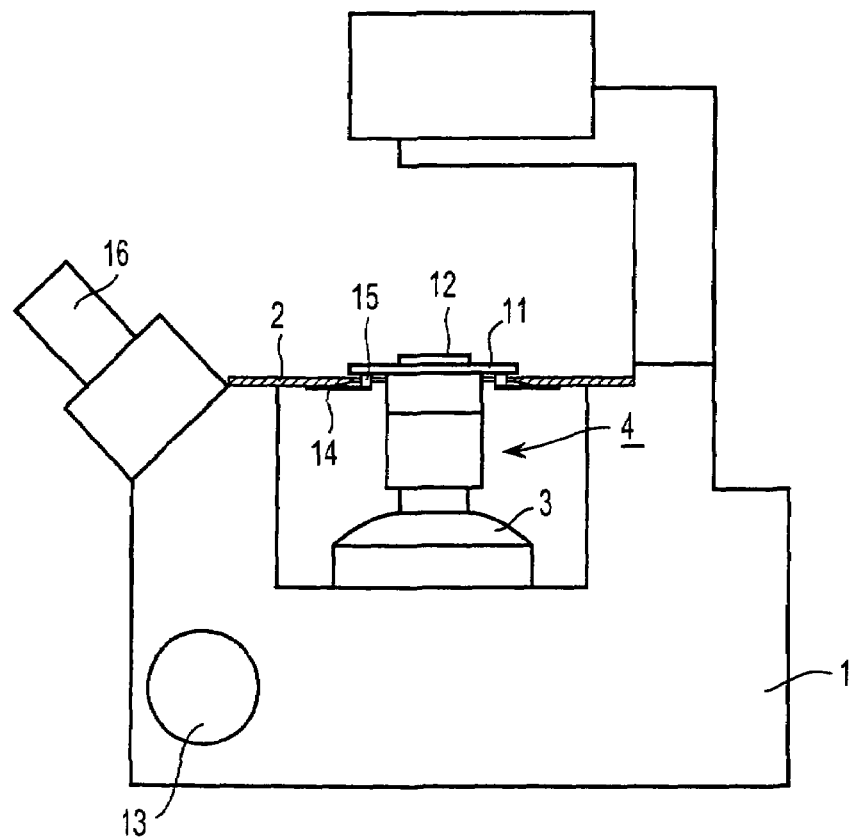
FIG. 12 is a view showing a structure of an inverted type microscope with a tenth embodiment of the present invention applied thereto.
Figure 13:
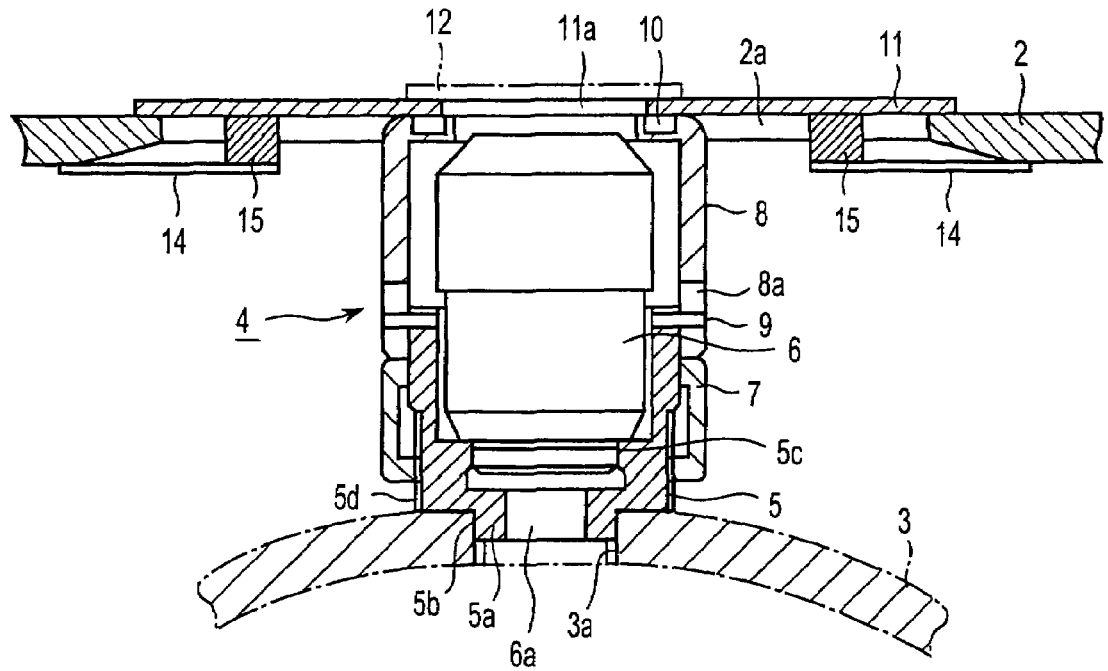
FIG. 13 is a schematic view showing the focus stabilizing apparatus above.

FIGS. 12 and 13 are views showing a structure of the tenth embodiment of the present invention, noting that the same reference numerals are employed to designate parts or elements corresponding to those in FIGS. 1 and 2.

The stage 2 is so provided on a microscope body 1 as to be movable in the XY direction. Below the stage 2, a revolver 3 is arranged with a focus stabilizing apparatus 4 provided thereon. It is to be noted that an optical system of the inverted type microscope is the same as that shown in FIG. 1 and an explanation of it is omitted here.

FIG. 13 is a schematic view showing a structure of the focus stabilizing apparatus 4. A fixing base 5, operation ring 7 and sample retaining base 8 are provided as a position adjusting means. The fixing base 5 of a cylindrical configuration has a small-diameter section 5a at one open end portion. An objective threaded section 5b is formed on the outer peripheral surface of the small-diameter section 5a and threadably inserted into an objective mount hole 3a of the revolver 3.

A threaded section 5c is provided on the inner wall surface of one open end portion of the fixing base 5. An objective screw 6a of the objective lens 6 is inserted in the threaded section 5c. In this state, the objective lens 6 is integrally fixed along an axis of a hollow section of the fixing base 5.

A threaded section 5d is provided on the outer peripheral surface of the fixing base 5 and one open end portion of a cylindrical operation ring 7 is threadably inserted over the threaded section 5d.

By rotationally operating this operation ring 7, the operation ring 7 as a whole is movable along the threaded section 5d, that is, along a direction of an optical axis Q of the objective lens 6.

One open end of the cylindrical sample retaining base 8 is so arranged as to abut against the operation ring 7. The sample retaining base 8 has a guide hole 8a formed along a moving direction of the operation ring 7. A rotation stop pin 9 provided on the fixing base 5 side is inserted through the guide hole 8a.

By rotationally operating the operation ring 7, the sample retaining base 8, while being guided in the guide hole 8a, is movable together with the operation ring 7 only along the direction of the optical axis Q of the objective lens 6.

Further, the other open end portions of the sample retaining base 8 is bent toward a center axis direction and a magnet 10 is provided at the bent open end portion of the base 8.

A sample base 11 is attracted onto the magnet 10 and formed of a magnetic material such as a magnetism attraction stainless steel. The sample base 11 retains an observation sample in place. The sample base 10 has an observation hole 11a in a position corresponding to the optical axis of the objective lens 6. A slide glass (sample) 12 is place over the observation hole 11a.

A hole 2a is formed in a stage 2 of the microscope at a position corresponding to the focus stabilizing device 4 on the optical axis Q of the objective lens 6. The same base 11 is placed at a marginal edge portion 2a of the stage 2.

A plurality of leaf springs (elastic means) 14 are provided on the lower surface of the stage 2 along the marginal edge of the hole 2a. The respective leaf spring 14 has its forward end directed toward the center of the hole 2a. That is, the respective leaf spring 14 is arranged in a horizontal direction orthogonal to the optical axis Q of the objective lens 6. The leaf spring 14 has its base end portion fixed to the marginal edge portion of the hole 2a.

A magnet 15 is mounted on the forward end portion of the leaf spring 14 and adapted to attract the sample base 11. Each magnet 15 supports the sample base 11 over the hole 2a of the stage 2 through the leaf spring 14. The reason for which the sample base 11 is attracted by the magnet 15 is because the sample base 11 is easily removable.

In FIG. 12, a focus setting handle 13 is provided on the microscope body 1. The handle 13 is such that, by being rotationally operated, it can move the revolver 3 equipped with the focus stabilizing apparatus 4 in an up/down direction.

An observation image of a slide glass (sample) 12 is projected through an objective lens 6 onto an observation optical system in the microscope body 1 and can be observed by an eyepiece 16.

The function of the embodiment thus structured will be explained below.

The focus stabilizing apparatus 4 having a plurality of objective lenses 6 of different magnifying powers is mounted on the revolver 3.

First, by the operation of the focus setting handle 13, the revolver 3 is moved in a downward direction. With the rotation of the revolver 3, the focus stabilizing apparatus 4 has its desired magnifying power objective lens 6 located on the optical path.

In a state with the revolver 3 moved in a downward direction, the sample base 11 is set away from the attraction of the magnet 10 on the sample retaining base 8 and the base 11 is set away from the focus stabilizing apparatus 4 and left on the stage 2 of the microscope body 1. At this time, the sample base 11 is attracted to the magnet 15 and supported on the stage 2 through the leaf springs 14.

Then, by the operation of the focus setting handle 13 the revolver 3 is moved in an upward direction and the focus stabilizing apparatus 4 is moved in an upward direction to allow the sample base 11 to be attracted to the magnet 10 on the sample retaining base 8.

Here, when the revolver 3 is moved further in an upward direction from a state in which the sample base 11 is attracted to the magnet 10 on the sample retaining base 8, then the sample base 11 simply placed over the marginal edge portion of the hole 2a in the stage 2 is moved away from the stage 2 and further pushed about a few millimeters upward.

By the way, since the leaf springs 14 supporting the sample base 11 are arranged in a horizontal direction orthogonal to the optical axis Q of the objective lens 6 and have a low rigidity in the optical axis Q of the objective lens 6, the sample base 11 is moved under the deformation of the leaf spring 14 without any resistance.

If the operation ring 7 is rotationally operated from this state, a positional setting is made between the slide glass (sample) 12 and the focal point of the objective lens 6. That is, when the operation ring 7 makes one rotation, the operation ring 7 is moved, in a "pitch" unit of the screw-threaded section 5d of the fixing base 5, along the optical axis Q direction of the objective lens 6. With the movement of the operation ring 7, the sample retaining base 8, being guided in the guide hole 8a, is moved in the optical axis Q direction.

By doing so, the sample base 11 is moved with the sample retaining base 8 since it is attracted by the magnet 10 to the sample retaining base 8, so that a relative positional relation between the slide glass (sample) 12 and the objective lens 6 varies. As a result, an alignment is set between the slide glass (sample) 12 and the focal point of the objective lens 6.

In that state of alignment, an observation image of the sample is projected through the objective lens 6 onto the observation optical system in the microscope body 1 and this image is observed through the eyepiece 14.

An explanation will be made below about the case where, in the state of alignment between the slide (sample) 12 and the objective lens 6, the slide glass (sample) 12 as a whole is moved in a direction (XY direction) orthogonal to the optical axis Q of the objective lens Q.

In this case, the stage 2 of the microscope body 1 is moved in the XY direction. At this time, the leaf spring 14 supporting the sample 11 is arranged in a horizontal direction orthogonal to the optical axis Q of the objective lens 6, so that the leaf spring 14 reveals a high rigidity in the XY direction of the stage 2.

When the stage is moved, the sample base 11 is moved as one unit to the stage 2 through the leaf spring 14. In this case, the sample base 11 is attracted to the magnet 10 on the sample retaining base 8 side. Since, on the other hand, the direction of movement of the sample base 11 corresponds to a direction orthogonal to an attraction force acting under the magnet 10, the sample base 11 is moved without any resistance while being retained in an attracted state.

Although, in the above-mentioned embodiment, a positional alignment has been explained as being made between the slide glass (sample) 12 and the focal point of the objective lens 6 by locating the focus stabilizing device 4 in a state to have its desired magnifying power objective lens 6 positioned on the optical path, the present invention is not restricted thereto. Even in the case where the focus stabilizing device 4 is located to have another magnifying power objective lens 6 positioned on the optical path, a positional alignment can be made between the slide glass (sample) 12 and the focal point of the objective lens 6 as in the case set out above.

According to the tenth embodiment as set out above, it is possible to obtain the same advantage as in the first embodiment. Further, the sample base 11 retaining the slide glass (sample) 12 is supported on the stage 2 through the leaf spring 14 revealing a low rigidity in the optical axis Q direction of the objective lens 6 and a high rigidity in the moving direction of the stage 2. By doing so, when the stage 2 is moved in the XY direction after the focus setting of the objective lens 6 has been made relative to the slide glass (sample) 12, the slide glass (sample) 12 can be moved in a direction orthogonal to the optical axis Q of the objective lens 6 and it is possible to readily position the slide glass (sample) 12 in the XY direction.

Then an explanation will be made below about an eleventh embodiment of the present invention.

Figure 14:
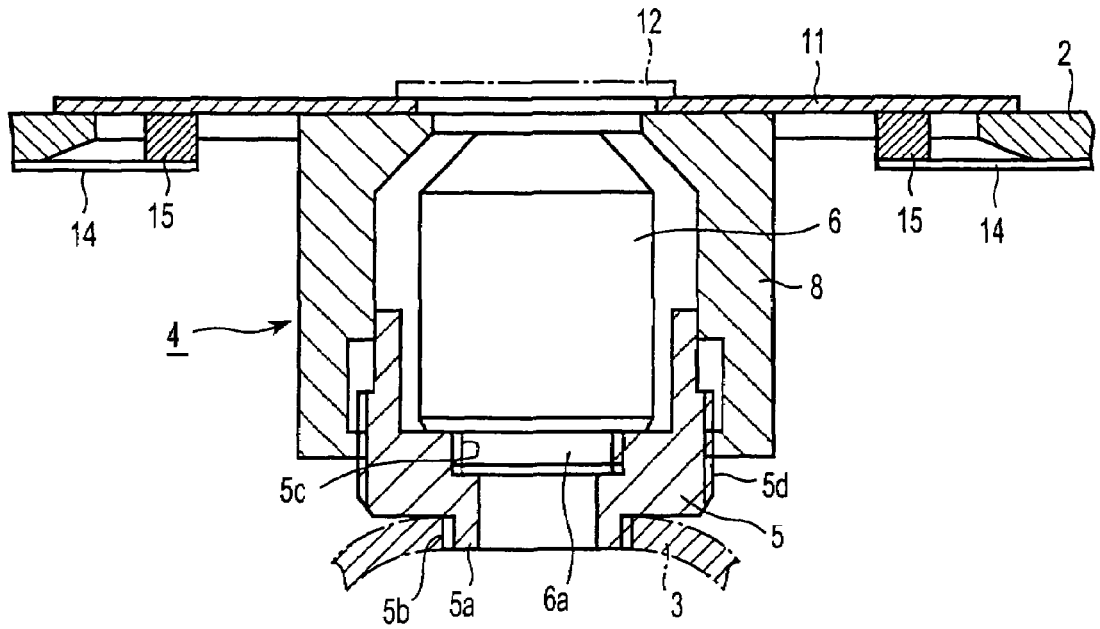
FIG. 14 is a schematic view showing a focus stabilizing apparatus of an eleventh embodiment of the present invention.

FIG. 14 is a view showing a structure of the eleventh embodiment of the present invention, noting that the same reference numerals are employed to designate parts or elements corresponding to those shown in FIG. 3. The eleventh embodiment is based on the same concept as in the tenth embodiment.

A hole 2a is formed in the stage 2 on the microscope body 1 side. This hole 2a is provided over an optical path Q of an objective lens 6 in a position corresponding to a focus stabilizing apparatus 4. A sample base 11 is placed on the marginal edge portion of the hole 2a.

A plurality of leaf springs 14 are provided on the lower surface of the stage 2 along the marginal edge of the hole 2a. The respective leaf springs 14 have their forward ends directed toward the center of the hole 2a, that is, these leaf springs are arranged in a horizontal direction orthogonal to the optical axis Q of the objective lens 6. The leaf springs 14 have their base end portions fixed to the marginal edge portions of the hole 2a. A magnet 15 is mounted on the forward end portion of the respective leaf spring 14.

The respective magnets 15 are adapted to attract the sample base 11 and support the sample base 11 over the hole 2a of the stage 2 through the leaf springs 14. The remaining portion is the same as in FIG. 3.

According to the eleventh embodiment as set out above, it is possible to obtain the same advantage as in the above-mentioned second embodiment. A stage 2 is moved in the XY direction after the focus setting of the objective lens 6 has been made relative to the slide glass (sample) 12. Then the slide glass (sample) 12 is moved through the leaf springs 14 which is so set as to reveal a high rigidity in the moving direction of the stage 2. The moving direction of the slide glass (sample) 12 corresponds to a direction orthogonal to the optical axis Q of the objective lens 6. It is thus possible to readily position the slide glass (sample) 12 in the XY direction.

An explanation will be made below about a twelfth embodiment of the present invention.

Figure 15:
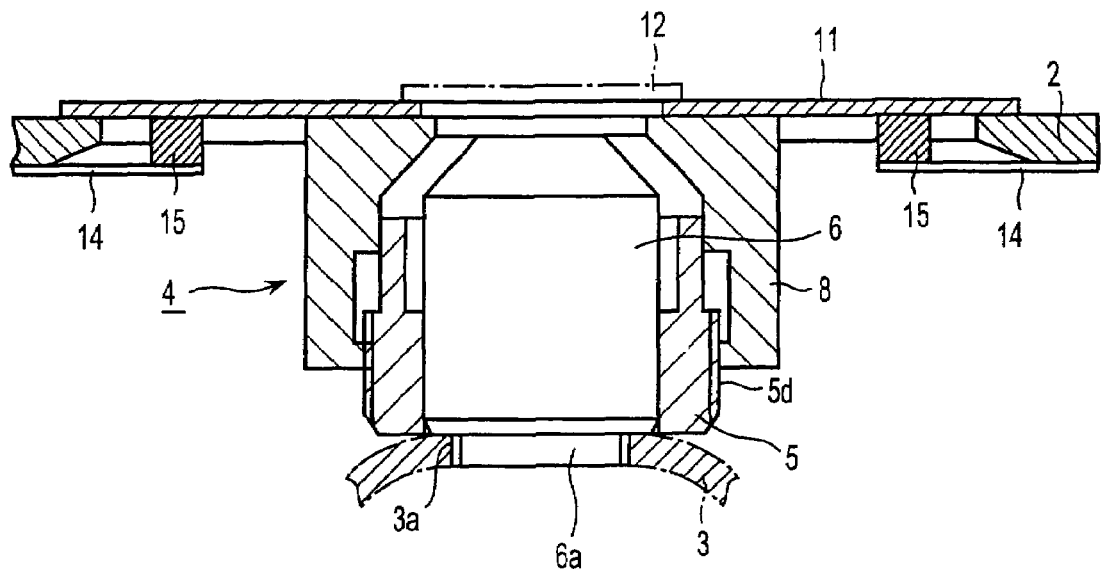
FIG. 15 is a schematic view showing a focus stabilizing apparatus of a twelfth embodiment of the present invention.

FIG. 15 is a view showing a structure of the twelfth embodiment of the present invention, noting that the same reference numerals are employed to designate parts or elements corresponding to those shown in FIG. 4. The twelfth embodiment is based on the same concept as that of the above-mentioned tenth embodiment.

A hole 2a is formed in a stage 2 on the microscope body 1 side. The hole 2a is provided in a position corresponding to a focus stabilizing apparatus 4 on an optical axis Q of an objective lens 6 and a sample base 11 is placed on the marginal edge portion of the hole 2a.

A plurality of leaf springs 14 are provided on the lower surface of a stage 2 along the marginal edge of the hole 2a and arranged in a horizontal direction orthogonal to an optical axis of the objective lens 6 so as to be directed toward the center of the hole 2a. These leaf springs 14 have their base end portions fixed on the marginal edge portion of the hole 2a. A magnet 15 is mounted on the forward end portion of the respective leaf spring 14.

Each magnet 15 is adapted to attract the sample base 11 and supports the sample base 11 over the hole 2a in the stage 2 through the leaf springs 14. The remaining portion is the same as in FIG. 4.

According to the twelfth embodiment, it is possible to obtain the same advantage as in the third embodiment. Further, the stage 2 is moved in the XY direction after a focus setting of the focus lens 6 has been made relative to the slide glass (sample) 12. Then the slide glass (sample) 12 can be moved in a direction orthogonal to the optical axis Q of the objective lens 6 since the leaf springs 14 are so set as to have a high rigidity in the moving direction of the stage 2. By doing so, it is possible to readily position the slide glass (sample) 12 in the XY direction.

An explanation will be made below about a thirteenth embodiment of the present invention.

Figure 16:
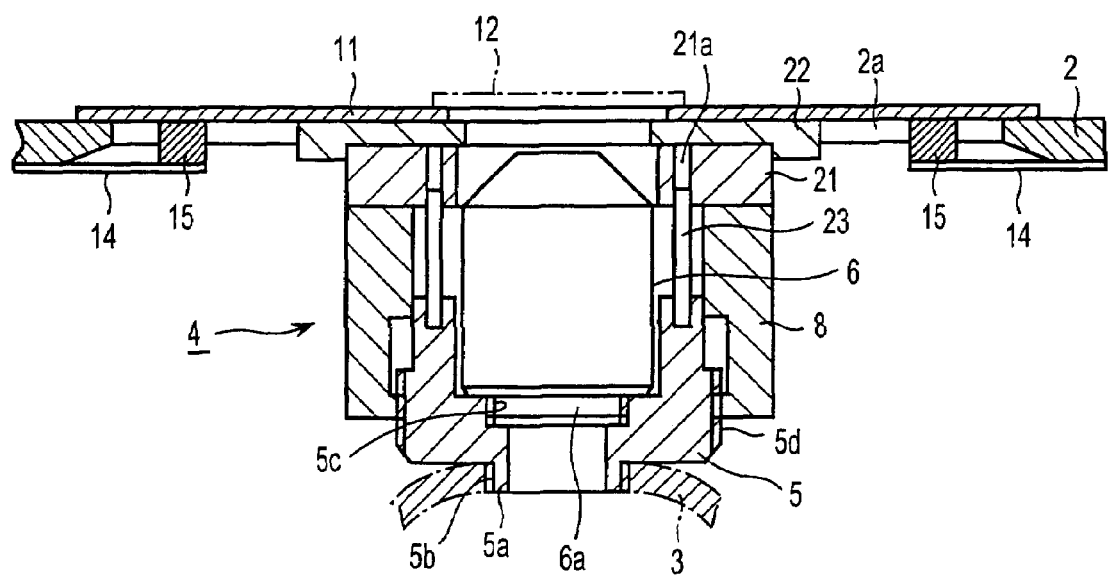
FIG. 16 is a schematic view showing a focus stabilizing apparatus of a thirteenth embodiment of the present invention.

FIG. 16 is a view showing a structure of the thirteenth embodiment of the present invention, noting that the same reference numerals are employed to designate parts or elements corresponding to those shown in the tenth embodiment. This embodiment is based on the same concept as that of tenth embodiment.

A hole 2a is formed in a stage 2 on a microscope body 1 side and located in a position corresponding to a focus stabilizing apparatus 4 on an optical path Q of an objective lens 6. A sample base 11 is placed on the marginal edge portion of the hole 2a. A plurality of leaf springs 14 are provided along the marginal edge of the hole 2a and arranged in a direction orthogonal to an optical axis of the objective lens 6 so as to have their forward ends directed toward the center of the hole 2a. These leaf springs 14 have their base end portions fixed to the marginal edge portion of the hole 2. A magnet 15 is mounted on the forward end portion of the respective leaf spring 14.

Each magnet 15 is adapted to attract the sample base 11 and supports the sample base 11 over the hole 2a in the stage 2 through the leaf spring 14. The remaining portion is the same as in FIG. 5.

According to the thirteenth embodiment, it is possible to obtain the same advantage as that of the fourth embodiment. The stage 2 is moved in the XY direction of the stage 2 after a focus setting of the objective lens 6 has been made relative to a slide glass (sample) 12. Then the slide glass (sample) 12 can be moved in a direction orthogonal to an optical axis Q of the objective lens 6 since the leaf springs 14 are so set as to reveal a high rigidity in the moving direction of the stage 2. It is, therefore, possible to readily position the slide glass (sample) 12 in the XY direction.

Then an explanation will be made below about a fourteenth embodiment of the present invention.

Figure 17:
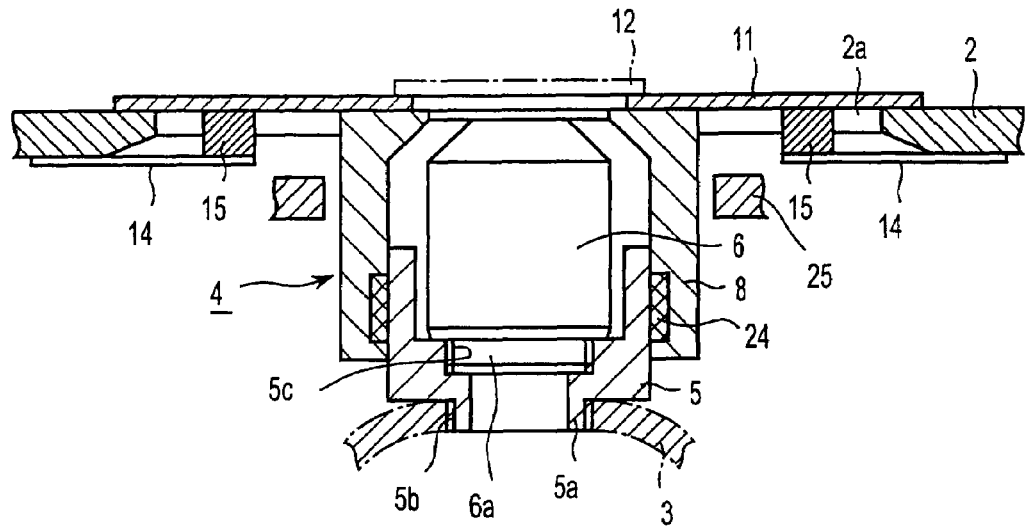
FIG. 17 is a schematic view showing a focus stabilizing apparatus of a fourteenth embodiment of the present invention.

FIG. 17 is a view showing a structure of the fourteenth embodiment, noting that the same reference numerals are employed to designate parts or elements corresponding to those shown in FIG. 6. This embodiment is based on the same concept as that of the tenth embodiment.

A hole 2a is formed in a stage 2 on the microscope body 1 side. This hole 2a is situated on an optical axis Q of an objective lens 6 in a position corresponding to a focus stabilizing apparatus 4. A sample base 11 is placed on the marginal edge portion of the hole 2a. A plurality of leaf springs 14 are mounted on the lower surface of the stage 2 along the marginal edge of the hole 2a. These leaf springs 14 are arranged in a horizontal direction orthogonal to the optical axis of the objective lens 6 to have their forward ends directed toward the center of the hole 2a. The leaf springs 14 have their base end portions fixed to the marginal edge portion of the hole 2a. A magnet 14 is mounted on the forward end portion of the respective leaf spring 14.

Each magnet 15 is adapted to attract the sample base 11 and supports the sample base 11 over the hole 2a of the stage 2 through the leaf springs 14. The remaining portion is the same as in FIG. 6.

According to the thirteenth embodiment, it is possible to obtain the same advantage as that of the fifth embodiment. In addition, the stage 2 is moved in the XY direction after a focus setting of an objective lens 6 has been made relative to the slide glass (sample) 12. Then the slide glass (sample) 12 is movable in a direction orthogonal to the optical axis Q of the objective lens 6 since the leaf springs 14 are so set as to exhibit a high rigidity in the moving direction of the stage 2. By doing so, it is possible to readily position the slide glass (sample) 12 in the XY direction.

An explanation will be made below about a fifteenth embodiment of the present invention.

Figure 18:
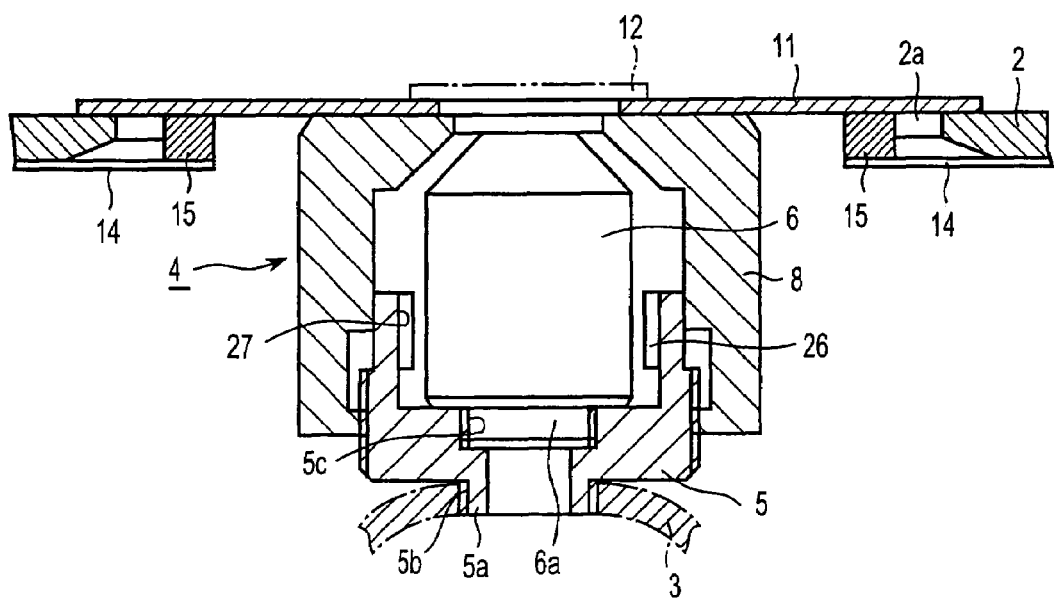
FIG. 18 is a schematic view showing a focus stabilizing apparatus of a fifteenth embodiment of the present invention.

FIG. 18 is a view showing a structure of the fifteenth embodiment of the present invention, noting that the same reference numerals are employed to designate parts or elements corresponding to those in FIG. 8. The fifteenth embodiment is based on the same concept as that of the tenth embodiment.

A hole 2a is formed in a stage 2 on a microscope body 1 side and situated over an optical axis Q of an objective lens 6 in a position corresponding to a focus stabilizing apparatus 4. A sample base 11 is placed on the marginal edge portion of the hole 2a. A plurality of leaf springs 14 are mounted on the lower surface of the stage 2 along the marginal edge of the hole 2a and arranged in a horizontal direction orthogonal to the optical axis of the objective lens 6 to have their forward ends directed toward the center of the hole 2a. These leaf springs 14 have their base end portions fixed to the marginal edge portion of the hole 2a. A magnet 15 is mounted on the forward end portion of the leaf spring 14.

Each magnet 15 is adapted to attract the sample base 11 and supports the sample base 11 over the hole 2a of the stage 2 through the leaf springs 14. The remaining portion is the same as in FIG. 8.

According to the fifteenth embodiment it is possible to obtain the same advantage as that of the sixth embodiment. In addition, the stage 2 is moved in an XY direction after a focus setting of the objective lens 6 has been made relative to a slide glass (sample) 12. Then, the slide glass (sample) 12 is movable in a direction orthogonal to the optical axis Q of the objective lens 6 since the leaf springs 14 are so set as to exhibit a high rigidity in the moving direction of the stage 2. By doing so, the slide glass (sample) 12 can be readily positioned in the XY direction.

An explanation will be made below about a sixteenth embodiment of the present invention.

Figure 19:
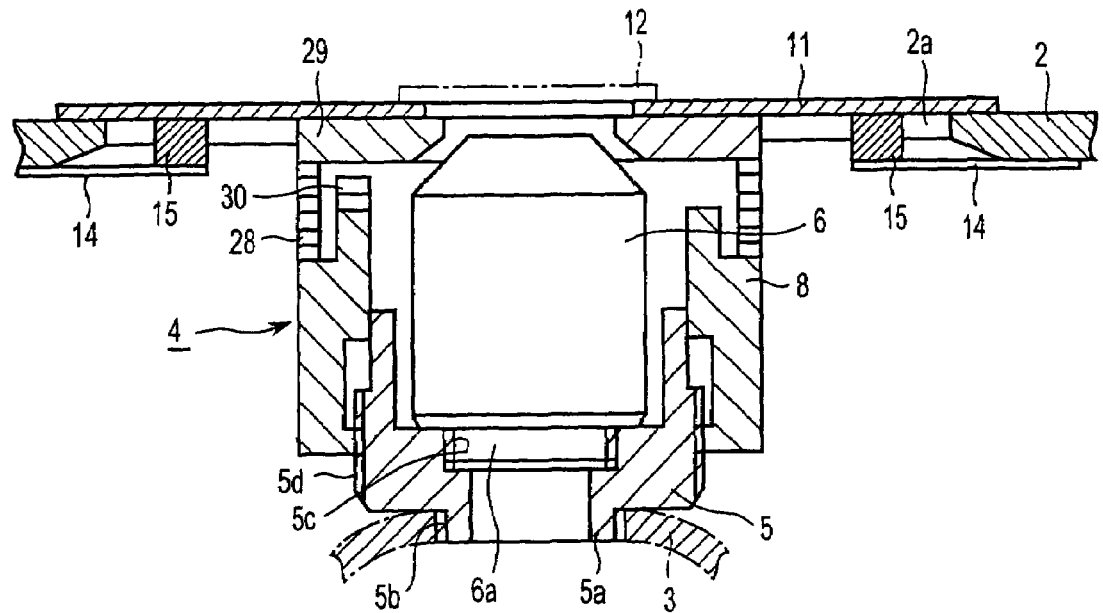
FIG. 19 is a schematic view showing a focus stabilizing apparatus of a sixteenth embodiment of the present invention.

FIG. 19 is a view showing a structure of the sixteenth embodiment of the present invention, noting that the same reference numerals are employed to designate parts or elements corresponding to those shown in FIG. 9. The sixteenth embodiment is based on the same concept as that of the tenth embodiment.

A hole 2a is formed in a stage 2 on a microscope body 1 side and situated over an optical axis of an objective lens 6 in a position corresponding to a focus stabilizing apparatus 4. A sample base 11 is placed on the marginal edge portion of the hole 2a. A plurality of leaf springs 14 are mounted on the lower surface of the stage 2 along the marginal edge of the hole 2a and arranged in a horizontal direction orthogonal to the optical axis of the objective lens 6 so as to have their forward ends directed toward the center of the hole 2a. These leaf springs-14 have their base end portions mounted on the marginal edge portion of the hole 2a. A magnet 15 is mounted on the forward end portion of the respective spring 14.

Each magnet 15 is adapted to attract a sample base 11 and supports the sample base 11 over the hole 2a of the stage 2 through the leaf springs 14. The remaining portion is the same as in FIG. 9.

According to the above-mentioned sixteenth embodiment it is possible to obtain the same advantage as that of the seventh embodiment. In addition, the stage 2 is moved in an XY direction after a focus setting of the objective lens 6 has been made relative to a slide glass (sample) 12. Then the slide glass (sample) 12 is movable in a direction orthogonal to the optical axis Q of the objective lens 6 because the leaf springs are so set as to exhibit a high rigidity in the moving direction of the stage 2. By doing so, it is possible to readily position the slide glass (sample) 12 in the XY direction.

An explanation will be made below about a seventeenth embodiment of the present invention.

Figure 20:
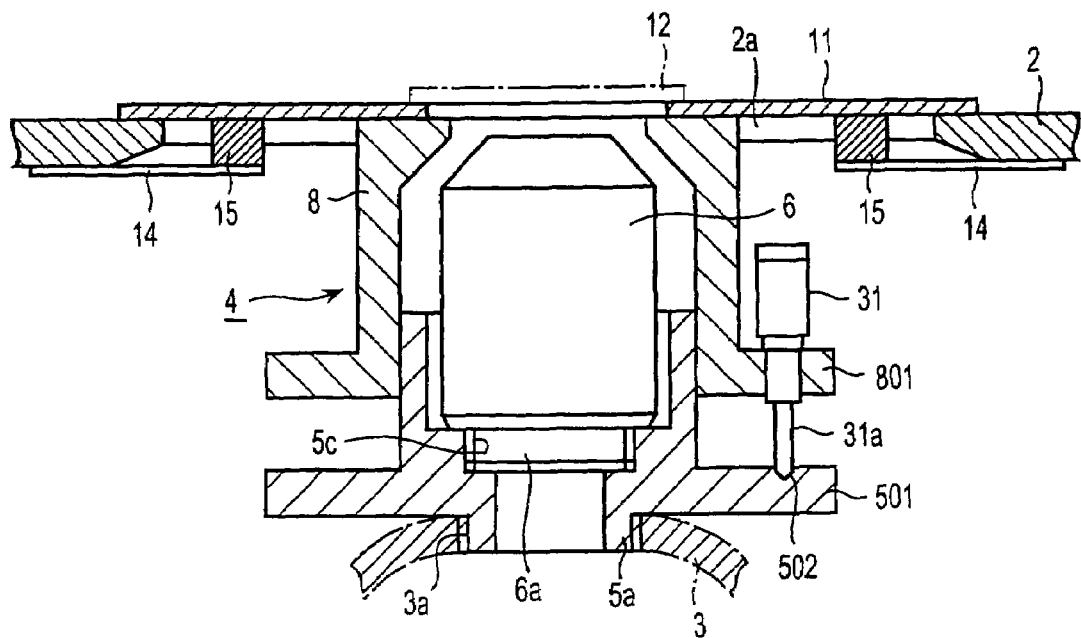
FIG. 20 is a schematic view showing a focus stabilizing apparatus of a seventeenth embodiment of the present invention.

FIG. 20 is a view showing a structure of the seventh embodiment of the present invention, noting that the same reference numerals are employed to designate parts or elements corresponding to those shown in FIG. 10. The seventeenth embodiment is based on the same concept as the tenth embodiment.

A hole 2a is formed in a stage 2 on a microscope body 1 side and situated over an optical axis Q of an objective lens 6 in a position corresponding to a focus stabilizing apparatus 4. A sample base 11 is placed on the marginal edge portion of the hole 2a. A plurality of leaf springs 14 are mounted on the lower surface of the stage 2 along the marginal edge of the hole 2a and arranged in a horizontal direction orthogonal to the optical axis of the objective lens 6 to have their forward ends directed toward the center of the hole 2a. These leaf springs 14 have their base portions fixed to the marginal edge portion of the hole 2. A magnet 15 is mounted on the forward end portion of the respective leaf spring 14.

Each magnet 15 is adapted to attract the sample base 11 and supports the sample base 11 over the hole 2a of the stage 2 through the leaf springs 14. The remaining portion is the same as in FIG. 10.

According to the seventeenth embodiment, it is possible to obtain the same advantage as that of the eighth embodiment. In addition, the stage 2 is moved in an XY direction after a focus setting of the objective lens 6 has been made relative to a slide glass (sample) 12. Then, the slide glass (sample) 12 is movable in a direction orthogonal to the optical axis Q of the objective lens 6 since the leaf spring 14 is so set as to reveal a high rigidity in the moving direction of the stage 2. By doing so, the slide glass (sample) 12 can be readily positioned in the XY direction.

Then an explanation will be made about an eighteenth embodiment of the present invention.

After a positional setting has been made between the slide glass (sample) 12 and the focal point of the objective lens 6, if the ambient temperature varies, there occurs a variation in the dimension of mechanical component parts, in the dimension of optical component parts, in the refractive index and so on. If this occurs, a relative position between the slide glass (sample) 12 and the focal point of the objective lens 6 varies, so that an observation image is degraded.

In the eighteenth embodiment, any degradation of the observation image can be avoided even if the ambient temperature varies.

Figure 21:
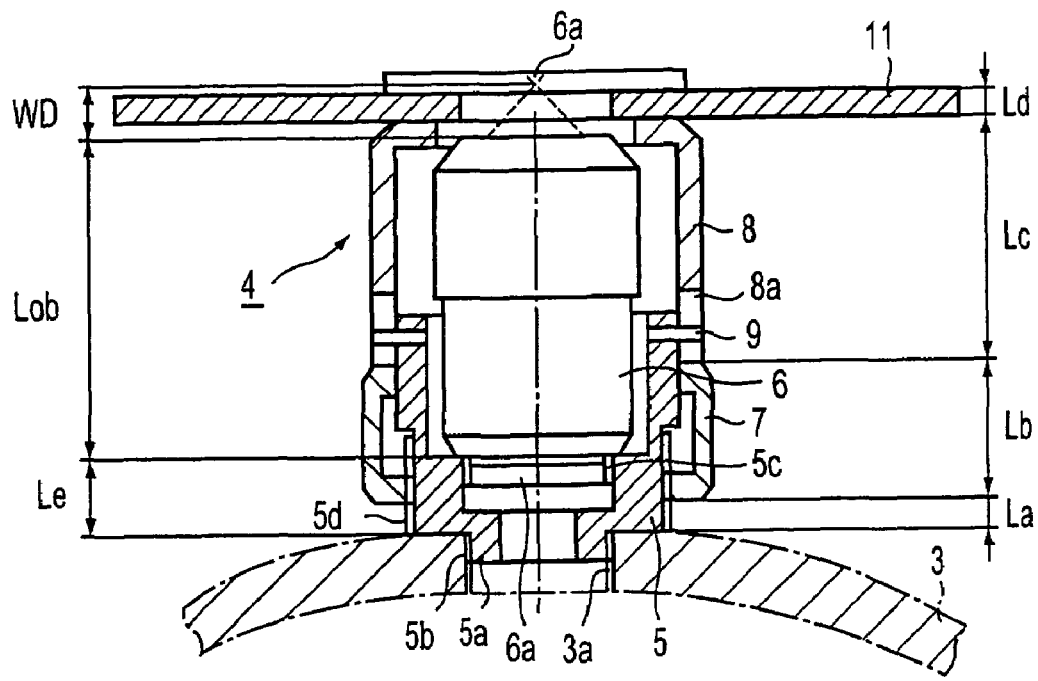
FIG. 21 is a schematic view showing a focus stabilizing apparatus of an eighteenth embodiment of the present invention.

FIG. 21 is a view showing the eighteenth embodiment of the present invention, noting that the same reference numerals are employed to designate parts or elements corresponding to these shown in FIG. 2.

An operation ring 7 and sample retaining base 8 arranged in an abutting relation to the operation ring 7 are made of materials having different linear expansion coefficients. The remaining portion is the same as in FIG. 2.

If the ambient temperature varies in such a structure, there occurs a variation in the dimension, distance and refractive index of the objective lens 6. Then, the distance WD between the forward end of the objective lens 6 and a focal position 6a of the objective lens 6 varies. A variation $\delta WD$ of the distance WD is found $$\delta WD = \alpha WD \times \Delta T \quad (1)$$

where a variation amount per unit temperature is represented by $\alpha WD$ and an ambient temperature variation is represented by $\Delta T$.

In the case where the ambient temperature varies to an extent $\Delta T$, the variation amount $\delta 0b$ of the forward end of the objective lens 6 in the optical axis direction defined with a threaded abutting surface of a fixing base 5 relative to a revolver 3 as a reference is found as follows. That is, with $\alpha 1$ representing the linear expansion coefficient of the fixing base 5 and $\alpha 4$ representing the linear expansion coefficient of the objective lens 6 and, further, Le and L0b representing the optical axis Q direction dimensions of the fixing base 5 and objective lens 6, respectively, exerting an influence over the variation amount $\delta 0b$ at this time, the above-mentioned variation amount $\delta 0b$ is found by $$\delta 0b = (\alpha 1 Le + \alpha 4 L 0b) \Delta T \quad (2)$$

Further, in the case where the ambient temperature varies to an extent $\Delta T$, an optical axis Q direction variation amount $\delta s$ of the upper surface of the sample base 11 defined with the threaded abutting surface of the fixing base 5 relative to the revolver 3 as a reference is found as follows. That is, with $\alpha 1$ representing the linear expansion coefficient of the fixing base 5, $\alpha 2$ representing the linear expansion coefficient of the operation ring 7, $\alpha 3$ representing the linear expansion coefficient of the sample retaining base 8 and $\alpha 5$ representing the linear expansion coefficient of the sample base 11 and, further, La, Lb, Lc and Ld representing the optical axis Q direction dimensions of the fixing base 5, operation ring 7, sample retaining base 8 and sample base 11, respectively, exerting an influence over the variation amount $\delta s$ at this time, the above-mentioned variation amount $\delta s$ is found by $$\delta s = (\alpha 1 La + \alpha 2 Lb + \alpha 3 Lc + \alpha 5 Ld) \Delta T \quad (3)$$

From this, a relative position variation amount $\delta$ between the slide glass (sample) 12 and the focal point of the objective lens 6 is found by $$\delta = \delta WD + \delta 0b - \delta s \quad (4)$$

As a result, in order to eliminate the degradation of an observation image, it is only necessary to given a condition $\delta = 0$ to the above-mentioned equation. Therefore, rearranging $\delta s = \delta WD + \delta 0B$ with the use of Equations (1) to (3) gives $$\alpha 1 La + \alpha 2 Lb + \alpha 3 Lc + \alpha 5 Ld = \alpha WD + \alpha 1\, Le + \alpha 4 L 0b \quad (5)$$

Here, the respective dimensions must satisfy $$La + Lb + Lc + Ld \approx WD + Le + L 0b \quad (6)$$

since the focal position 6a of the objective lens 6 and the upper surface of the sample base 11 substantially coincide with each other.

If, therefore, the material and dimension of each component part are selected to satisfy the above-mentioned Equations (5) and (6), the position between the slide glass (sample) 12 and the focal point of the objective lens 6 can be maintained constant even if the ambient temperature varies and it is possible to prevent the degradation of the observation image.

An explanation will be made below about an example. For example, if La=2 mm, Ld=2 mm, Le=8 mm, L0b= 44.8 mm, WD=0.2 mm, $\alpha WD = 0.1 \times 10^{-3}$ mm/K, $\alpha 1 = \alpha 5 = 10.1 \times 10^{-6}$/K (iron material), $\alpha 3 = 23.5 \times 10^{-6}$/K (aluminum material) and $\alpha 2 = \alpha 4 = 20.8 \times 10^{-6}$ (brass) and if the dimension Lb of the operation ring 7 and dimension Lc of the sample retaining base 8 for eliminating the degradation of the observation image are found, the above-mentioned Equation (5) can be rearranged as follows.

$$20.8Lb+23.5Lc=1072.24$$

Further, the above-mentioned Equation (6) can be rearranged as follows.

$$Lb+Lc=49.$$

As a result, it is possible to obtain Lb=29.4 and Lc=19.6. If the operation ring 7 and sample retaining base 8 of these dimensions are selected and used, then any degradation of the observation image can be prevented even if the ambient temperature varies.

According to the above-mentioned eighteenth embodiment, by selecting the material and dimension of the operation ring 7 and sample retaining base 8, the position between the slide glass (sample) 12 and the focal point of the objective lens 6 can be maintained at all times constant even if the ambient temperature varies, so that it is possible to positively prevent the degradation of the observation image.

Further, since different materials are used for the fixing base 5 and operation ring 7, it can be expected that a smooth rotation is made in the threaded engagement of the threaded portions of both.

An explanation will be made below about a nineteenth embodiment of the present invention.

Figure 22:
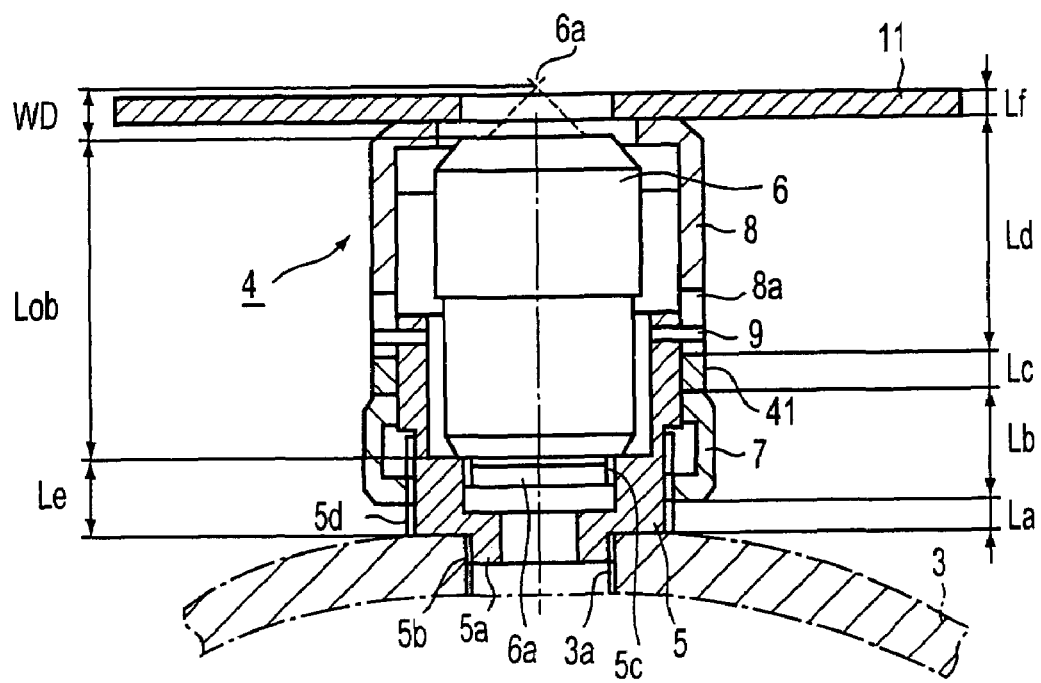
FIG. 22 is a schematic view showing a focus stabilizing apparatus of a nineteenth embodiment of the present invention.

FIG. 22 is a view showing a structure of the nineteenth embodiment of the present invention, noting that the same reference numerals are employed to designate parts or elements corresponding to those shown in FIG. 21. The nineteenth embodiment is based on the same concept as that of the eighteenth embodiment.

An auxiliary member 41 is arranged between an operation ring 7 and a sample retaining base 8 and the materials of different linear expansion coefficients are used for the sample retaining base 8 and auxiliary member 41. The remaining portion is the same as in FIG. 21.

Even in such a structure, if there occurs a variation in the dimension, distance and refractive index of an objective lens 6 with a variation in the ambient temperature, then the distance WD varies. With αWD representing a variation amount per unit temperature and ΔT representing a variation of the ambient temperature, a variation δWD at the distance WD is found by $$\delta WD = \alpha WD \times \Delta T \qquad (7)$$

Further, in the case where the ambient temperature varies to an extent ΔT, the optical axis direction variation amount δ0b at the forward end of the objective lens 6 defined with a threaded abutting surface of the fixing base 5 relative to a revolver 3 as a reference is found as follows. That is, with α1 representing the linear expansion coefficient of a fixing base 5 and α4 representing the linear expansion coefficient of the objective lens 6 and, further, with Le and L0b representing the optical axis direction dimensions of the fixing base 5 and objective lens 6, respectively, exerting an influence over the variation amount δ0b, the above-mentioned variation amount δ0b is found by $$\delta 0b = (\alpha 1 Le + \alpha 4 L0b) \times \Delta T \qquad (8)$$

In the case where the ambient temperature varies to an extent ΔT, an optical axis direction variation amount δs at the upper surface of a sample base 11 defined with a threaded abutting surface of the fixing base 5 relative to the revolver 3 as a reference is found as follows. That is, with α1, α2, α6, α3 and α5 representing the linear expansion coefficients of the fixing base 5, operating ring 7, auxiliary member 41, sample retaining base 8 and sample base 11, respectively, and, further, with La, Lb, Lc, Ld and Lf representing the optical axis direction dimensions of the fixing base 5, operation ring 7, auxiliary member 41, sample retaining base 8 and sample base 11, respectively, exerting an influence over a variation amount δs, the above-mentioned variation amount δs is found by $$\delta s = (\alpha 1 La + \alpha 2 Lb + \alpha 6 Lc + \alpha 3 Ld + \alpha 5 Lf) \Delta T \qquad (9)$$

Therefore, a relative position variation amount δ between the slide glass (sample) 12 and the focal point of the objective lens 6 is found by $$\delta = \delta WD + \delta 0b - \delta s \qquad (10)$$

As a result, in order to eliminate the degradation of an observation image it is only necessary to impart a condition δ=0 to the above-mentioned equation. Rearranging δs=δWD+δ0b with the use of Equations (7) to (9) gives $$\alpha 1 La + \alpha 2 Lb + \alpha 6 Lc + \alpha 3 Ld + \alpha 5 Lf = \alpha WD + \alpha 1 Le + \alpha 4 L0b \qquad (11).$$

Here, since the focal position 6a of the objective lens 6 and the upper surface of the sample base 11 substantially coincide, it is necessary that the respective dimensions involved satisfy $$La+Lb+Lc+Ld+Lf \approx WD+Le+L0b \qquad (12)$$

If, therefore, the material and dimension of each component part are selected to satisfy Equations (11) and (12), the position between the slide glass (sample) 12 and the focal point of the objective lens 6 can be maintained constant even if the ambient temperature varies, so that it is possible to prevent the degradation of the observation image.

Stated in more detail, if the dimension Lc of the auxiliary member 41 and dimension Ld of the sample retaining base 8 for eliminating the degradation of the observation image are found in the case of, for example, La=2 mm, Lb=10 mm, Lf=2 mm, Le=8 mm, L0b= 44.8 mm, WD=0.2 mm, αWD=0.1×10⁻³/K, α1=α5= 10.1×10⁻⁶/K (iron material), α2=α6=α4= 20.8×10⁻⁶/K (brass) and α3=23.5×10⁻⁶/(aluminum material), Equation (11) above can be rearranged as follows.

$$20.8Lc+23.5Ld=864.24$$

Further, the above-mentioned Equation (12) can be rearranged as follows.

$$Lc+Ld=39$$

As a result, since it is possible to obtain Lc=19.4 and Ld=19.6, if the auxiliary member 41 and sample retaining base 8 of these dimensions are selected and used, the degradation of the observation image can be prevented even if the ambient temperature varies.

According to the above-mentioned nineteenth embodiment it is possible to attain the same advantage as that of the eighteenth embodiment. In addition, it is not necessary to change the dimension of the operation ring 7 of a complex configuration having a threaded section. It is, therefore, possible to reduce a manufacturing cost and hence to obtain an economic advantage.

Although the different materials are used for the operation ring 7 and sample retaining base 8 in the above-mentioned eighteenth embodiment and the different materials are used for the auxiliary member 41 and sample retaining base 8 in the nineteenth embodiment, these are taken by way of example and the above-mentioned advantage can be expected on those elements constituting a position adjusting means of the focus stabilizing apparatus by using at least two different kinds of materials and selecting the material and dimension for these constituent elements.

Although the above-mentioned eighteenth embodiment and nineteenth embodiment have been explained as being applied only to the structure of the first embodiment shown in FIG. 2, they can be applied also to the structures shown in the above-mentioned second embodiment to the seventh embodiment.

Then an explanation will be made below about a twentieth embodiment.

Figure 23:
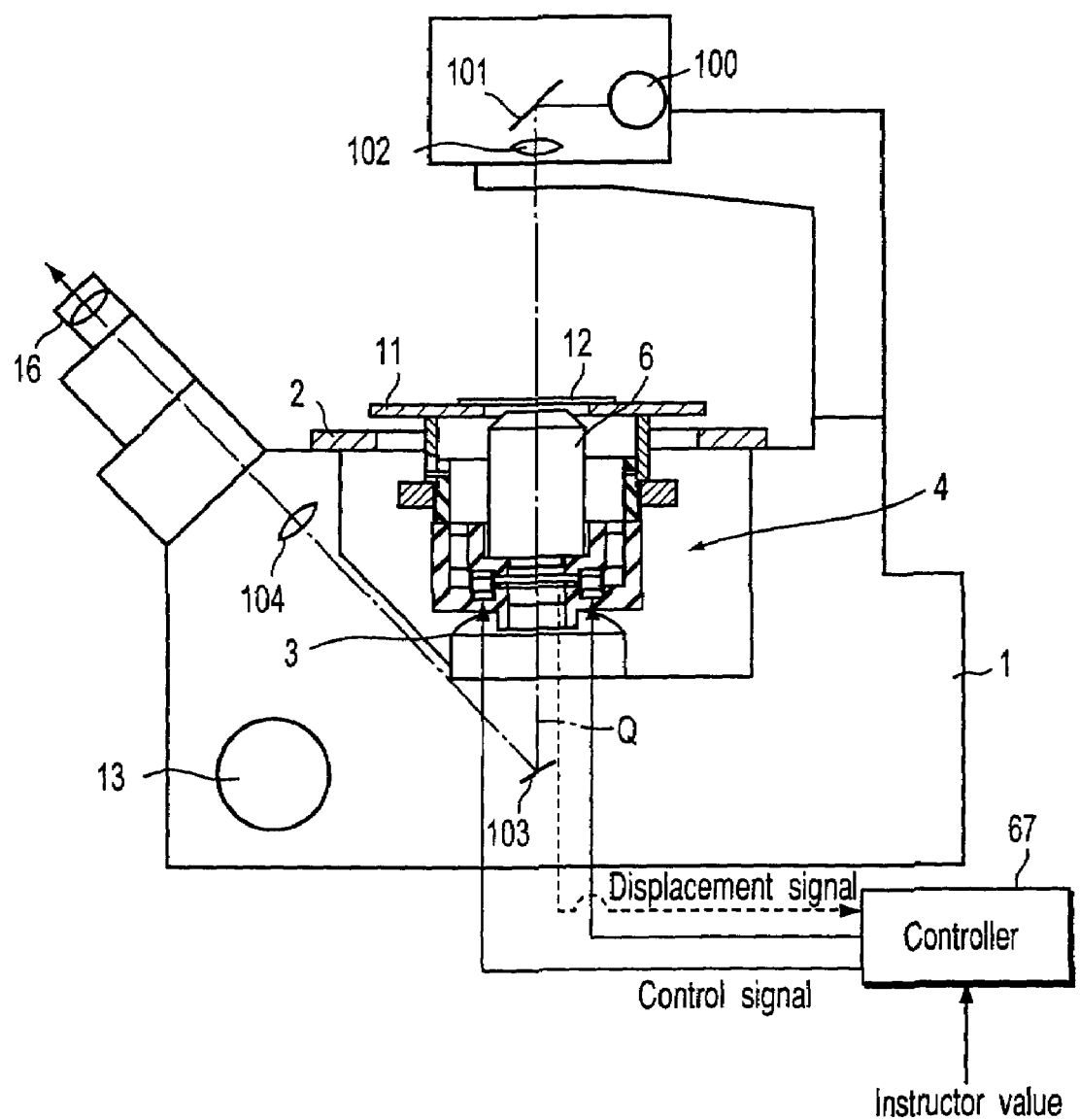
FIG. 23 is a view showing a structure of an inverted type microscope with a focus stabilizing apparatus of a twentieth embodiment of the present invention applied thereto.

FIG. 23 is a view showing a structure of an inverted type microscope to which the focus stabilizing apparatus of the present invention is applied. A stage 2 is provided on a microscope body 1 and a revolver 3 is arranged below the stage 2. A focus stabilizing apparatus 4 is provided on the revolver 3.

An explanation will be made below about an optical system of the inverted type microscope. A mirror 101 is arranged on an optical path of illumination light outputted from a light source 100. A condensing lens 102 is arranged on a reflection path of the mirror 101 to allow the illumination light to condense onto a slide glass (sample) 12. A mirror 103 is arranged on an optical axis Q of an objective lens 6 within the microscope body 1. On a reflection optical path of the mirror 103 an eyepiece 16 is provided through a relay lens 104.

Figure 24:
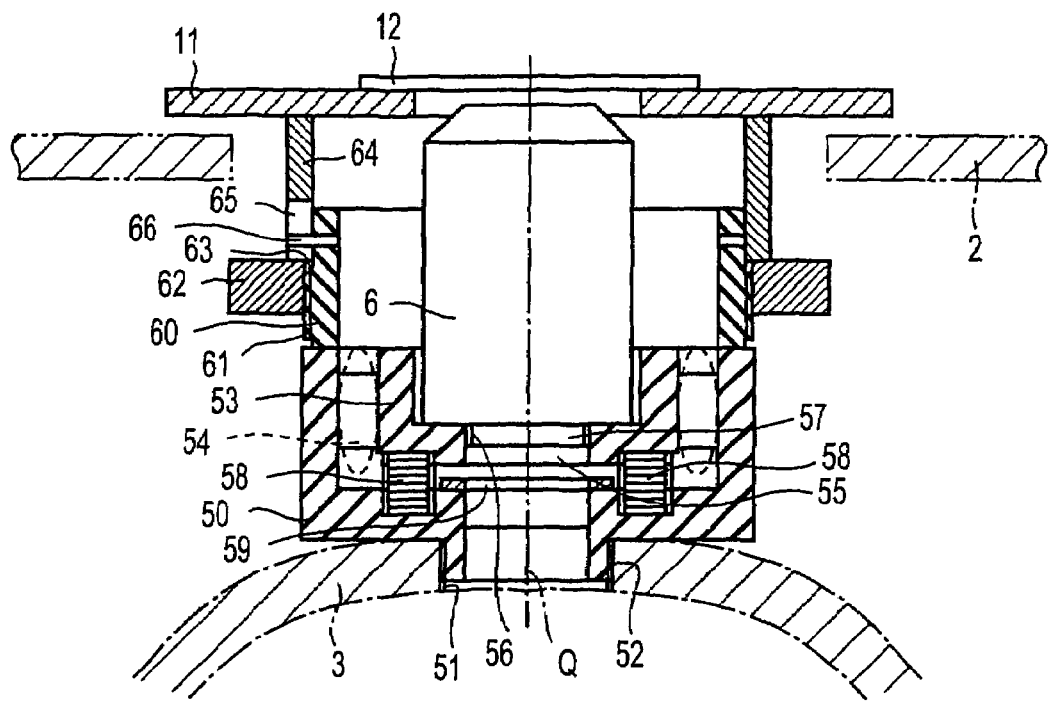
FIG. 24 is a schematic view showing a focus stabilizing apparatus above.

FIG. 24 is a schematic view showing a structure of a focus stabilizing apparatus 4. A fixing base 50 is threadably mounted on the revolver 3 having threaded mount hole 51. This mounting is achieved by a threaded engagement made between a threaded section 61 formed on the revolver 3 and a threaded section 52 formed on the lower portion of a fixing base 50. The fixing base 50 is cylindrically configured to set an objective lens 6 therein. Within the fixing base 50, a moving stage 53 is so supported as to be movable in an optical axis Q direction through parallel springs 54.

The objective lens 6 is mounted on the moving stage 53. At the bottom section of the moving stage 53 an opening 55 is provided to secure an optical path of an image from the objective lens 6. The mounting of the objective lens 6 to the moving stage is achieved by a threaded engagement made between a threaded section 56 formed on the moving stage 53 and a threaded section 57 of the objective lens 6.

A piezoelectric actuator 58 is provided between the fixing base 50 and the moving stage 53. An extending/contracting direction of the piezoelectric actuator 58 is parallel to the optical axis Q. When, therefore, the actuator 58 is extended/contracted, then the objective lens 6 mounted on the moving stage 53 is minutely moved along the optical axis Q direction.

It is to be noted that such a minute movement mechanism is constituted by the moving stage 53, parallel springs 54 and piezoelectric actuator 58.

A displacement sensor 59 is provided as a displacement amount detecting means on the fixing base 50. This displacement sensor 59 is provided on the fixing base 50 opposite to the bottom surface of the moving stage 53 and adapted to detect an optical axis Q direction displacement amount of the objective lens 6 and output its displacement signal. As this displacement sensor 59 use is made of, for example, an electrostatic capacity sensor.

A fixing cylinder 60 is provided on the upper side of the fixing base 50. A threaded section 61 is provided on the outer periphery of the fixing cylinder 60. An annular operation ring 62 is threaded over the threaded section 61. That is, a threaded section 63 is formed on the inner wall of the operation ring 62 and threadably inserted over the threaded section 61 of the fixing cylinder 60.

Therefore, when the operation ring 62 is rotated relative to the fixing cylinder 60, it is moved in an up/down direction by a distance corresponding to the pitch of the respective screw-threaded sections 61 and 63. The up/down movement direction is parallel to the optical axis Q direction.

A cylindrical, sample retaining base 64 is placed on the operation ring 62 and a sample base 11 is provided on the sample retaining base 64. A slide glass (sample) 12 is placed on the sample base 11.

A guide hole 65 is provided in the wall of the sample retaining base 64 and formed, for example, as a hole which is elongated parallel to the optical axis Q direction. Into the guide hole 65, a guide pin 66 provided on the fixing cylinder 60 is inserted.

When, therefore, the operation ring 62 is rotated and, by doing so, moved in an up/down direction, the sample retaining base 64 is moved, with the movement of the operation ring, in the up/down direction. With the up/down movement of the sample retaining base 64, the slide glass (sample) 12 is moved in an up/down direction through the sample base 11, so that a relative distance between the objective lens 6 and the slide glass (sample) 12 varies.

It is to be noted that a position adjusting means is constituted by the operation ring 62, sample retaining base 64, sample base 11, guide hole 65 and guide pin 66.

A controller 67 has a function of receiving the displacement signal outputted from the displacement sensor 59, a function of comparing this displacement signal and an instruction value and a function of imparting a control signal for moving the objective lens 6 to a position designated by the instruction value in accordance with a deviation between the displacement signal and the instruction value to the piezoelectric actuator 58. This control signal shows a voltage value applied to the piezoelectric actuator 58.

Now the operation of the thus structured embodiment will be explained below.

The focus setting between the objective lens 6 and slide glass (sample) 12 is done by rotating the operation ring 62. When the operation ring 62 makes one rotation, it is up/down moved, in the optical axis Q direction, by a distance corresponding to the pitch of the screw-threaded sections 61, 63.

With the movement of the operation ring 62 in the up/down direction, the sample retaining base 64 is moved in the up/down direction. With the movement of the sample retaining base 64 in the up/down direction, the sample base 11 and slide glass (sample) 12 on the sample base 11 are moved in the up/down direction.

By doing so, a relative position between the objective lens 6 and the slide glass (sample) 12 varies, so that a positional setting is done between the focal point of the objective lens 6 and the slide glass (sample) 12.

On the other hand, the displacement sensor 59 detects an optical axis Q direction displacement amount of the objective lens 6 and outputs its displacement signal. This displacement signal is sent to the controller 67.

This controller 67 receives the displacement signal outputted from the displacement sensor 59, compares the displacement signal with an instruction value and imparts a control signal for moving the objective lens 6 to a position designated by the instruction value in accordance with a deviation to the piezoelectric actuator 58.

The piezoelectric actuator 58 performs its extending/contracting operation in the direction parallel to the optical axis Q in accordance with the control signal imparted to the controller 67. When the piezoelectric actuator 58 performs such an operation, then the objective lens 6 mounted on the moving stage 53 is minutely moved in the optical axis Q direction.

By varying the instruction value, a fine focus adjustment can be electrically made by the minute movement mechanism and control means. The instruction value is produced as set out above by an operation dial so structured as to generate a variable instruction value by the rotation operation and by a personal computer, etc., having a built-in program for automatically generating a desired instruction value. That is, after the focus setting has been done by the position adjusting means it is possible to readily and electrically make a fine focus adjustment.

Even if there occurs a greater variation of the ambient temperature, the controller 67 performs the feedback control of the minute operation mechanism so as to eliminate a deviation of the displacement signal relative to the instruction value. By doing so, the objective lens 6 is maintained to a desired position given by the instruction value. If the objective lens 6 is so maintained to the desired position, it is possible to observe the slide glass (sample) 12 in a stable way.

Then an explanation will be made below about the switching of the objective lens 6. When a focus setting handle 13 is rotated, the revolver 3 is moved, for example, downward. With the downward movement of the revolver 3, the sample base 11 is moved downward to allow the sample base 11 to gradually approach, and contact with, the stage 2.

When the revolver 3 continues its downward movement after the contact of the sample base 11 with the stage 2, the sample retaining base 64 is moved away from the sample base 11. When, after this, the revolver 3 is rotated, then it is possible to switch the objective lens 6 to another kind of objective lens 6.

According to the above-mentioned twentieth embodiment, the mechanical coupling length between the objective lens 6 and the slide glass (sample) 12 is determined by the fixing base 50, operation ring 62 and sample retaining base 64 and it can be set to be very short. In the positional setting between the slide glass (sample) 12 and the focal point of the objective lens 6 achieved by the rotation operation of the operation ring 62, there is almost no variation in the position setting between the sample and the focal point of the objective lens 6 even if the ambient temperature varies. Further, it is not affected even by an external vibration and a better sample observation can be made at all times under a stable condition.

Further, since a fine focus adjustment can be electrically made with the use of the minute movement mechanism, if a plurality of instruction values for example are initially stored in a way to correspond to the positions of the objective lenses 6 and an instruction value corresponding to a desired position is imparted to the controller 67, then the objective lens 6 can be position controlled to be set to a desired position under a better reproduction condition.

By detecting the optical axis Q direction displacement amount of the objective lens 6 by means of the displacement sensor 59 and comparing its displacement signal with the instruction value it is possible to perform an extending/contracting operation of the piezoelectric actuator 58 in accordance with its deviation obtained. By doing so, the objective lens 6 is maintained to a desired position imparted by the instruction value, so that the slide glass (sample) 12 can be observed under a stable condition over a longer period of time.

Further, the parallel springs 54 and piezoelectric actuators 58 are symmetrically arranged relative to the optical axis Q and, when the objective lens 6 is minutely moved, an unrequited motion such as a fall, is alleviated.

Since a respective independent voltage can be applied to the piezoelectric actuator 58, an individual difference of the displacement of the piezoelectric actuator 58 can be adjusted by adjusting this applied voltage.

In this embodiment, the displacement sensor 59 may be omitted and the minute movement mechanism may be used as "an electrical fine focus adjusting mechanism". In the present embodiment (the present invention), the mechanical coupling length between the objective lens and the slide glass is made short and, by doing so, any defocusing resulting from a temperature variation is naturally smaller. Thus, the sample observation can be made under a substantially stable condition without performing any feedback control using the displacement sensor.

An explanation will be made below about a twenty-first embodiment of the present invention.

Figure 25:
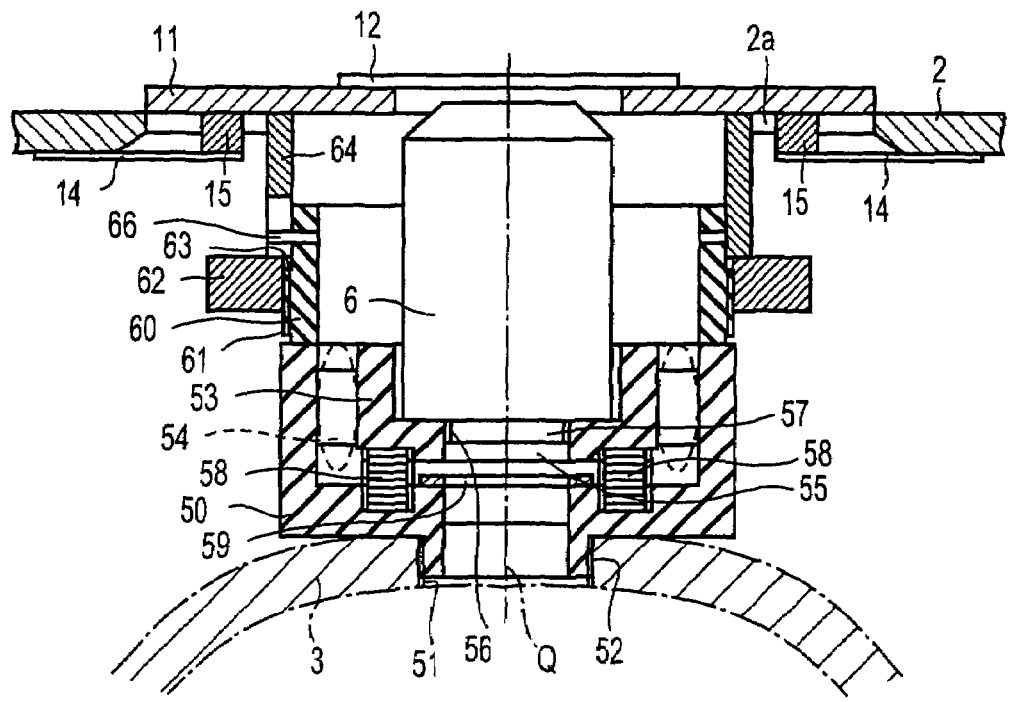
FIG. 25 is a schematic view showing a focus stabilizing apparatus of a twenty-first embodiment of the present invention.

FIG. 25 is a view showing a structure of the twenty-first embodiment of the present invention, noting that the same reference numerals are employed to designate parts or elements corresponding to those shown in FIG. 24 and any detailed explanation of them are omitted.

A plurality of leaf springs 14 are provided on the lower surface of a stage 2 along the marginal edge of a hole 2a and serves as an elastic means. These leaf springs 14 are so arranged as to have their forward ends extended toward the center of the hole 2a. That is, the leaf springs 14 are arranged in a horizontal direction orthogonal to an optical axis Q of the objective lens 6 and have their base end portions fixed to the marginal edge portion of the hole 2a. A magnet 15 is mounted on the forward end portion of the leaf spring 14.

Each magnet 15 is adapted to attract a sample base 11 and supports the sample base 11 over the hole 2a of the stage 2 through the leaf spring 14. The reason why the sample base 11 is attracted by the magnet 15 is because the sample base 11 is readily detachable by doing so.

Then the operation of the thus arranged embodiment will be explained below.

A plurality of focus stabilizing devices 4 are mounted on a revolver 3 and have objective lenses 6 of different magnifying powers.

First, a focus setting handle 13 is operated to move the revolver 3 in a downward direction. With this movement, the revolver 3 is rotated to locate a given focus stabilizing device of a desired magnifying power onto the optical path.

With the revolver 3 in a downwardly moved state, the sample base 11 is left on the stage 2 of the microscope body 1 and, in this case, the sample base 11 is attracted by the magnets 11 and supported on the stage 2 through the leaf springs 14.

Then, the focus setting handle 13 is operated to move the revolver 3 in an upward direction. By doing so, the focus stabilizing apparatus 4 is moved in an upward direction, so that the sample base 11 placed on the marginal edge portion of the hole 2a of the stage 2 is moved away from the stage 2 and pushed in the upward direction further by about a few millimeters.

Since at this time the leaf springs 14 supporting the sample base 11 are arranged in a horizontal direction orthogonal to the optical axis of the objective lens 6 and, hence reveal a low rigidity relative to the optical axis direction of the objective lens 6, the sample base 11 is movable under a deformation of the leaf spring without a resistance.

If the slide glass (sample) 12 as a whole is to be moved in a direction orthogonal to the optical axis of the objective lens 6, that is, in an XY direction, from a state in which an alignment is set between the slide glass (sample) 12 and the focal point of the objective lens 6, the stage 2 of the microscope body 1 is moved in the XY direction.

Since, at this time, the leaf springs 14 supporting the sample base 11 are arranged in the horizontal direction orthogonal to the optical axis of the objective lens 6, they reveal a high rigidity in the movement of the stage 2 in the XY direction. By moving the stage 2, therefore, the sample base 11 together with the stage 2 is moved as one unit through the leaf springs 14.

Since, according to the above-mentioned twenty-first embodiment, the sample base 11 retaining the slide glass (sample) 12 is supported on the stage 2 through the leaf springs 14 revealing a low rigidity in the optical axis direction of the objective lens 6 and a high rigidity in the moving direction of the stage 2, if the stage is moved in the XY direction after the focus setting of the objective lens 0.6 has been achieved relative to the slide glass (sample) 12, the slide glass (sample) 12 can be moved in the direction orthogonal to the optical axis direction of the objective lens 6 through the leaf springs 14 and it is possible to readily position the slide glass (sample) 12 in the XY direction.

An explanation will be made below about a twenty-second embodiment of the present invention.

Figure 26:
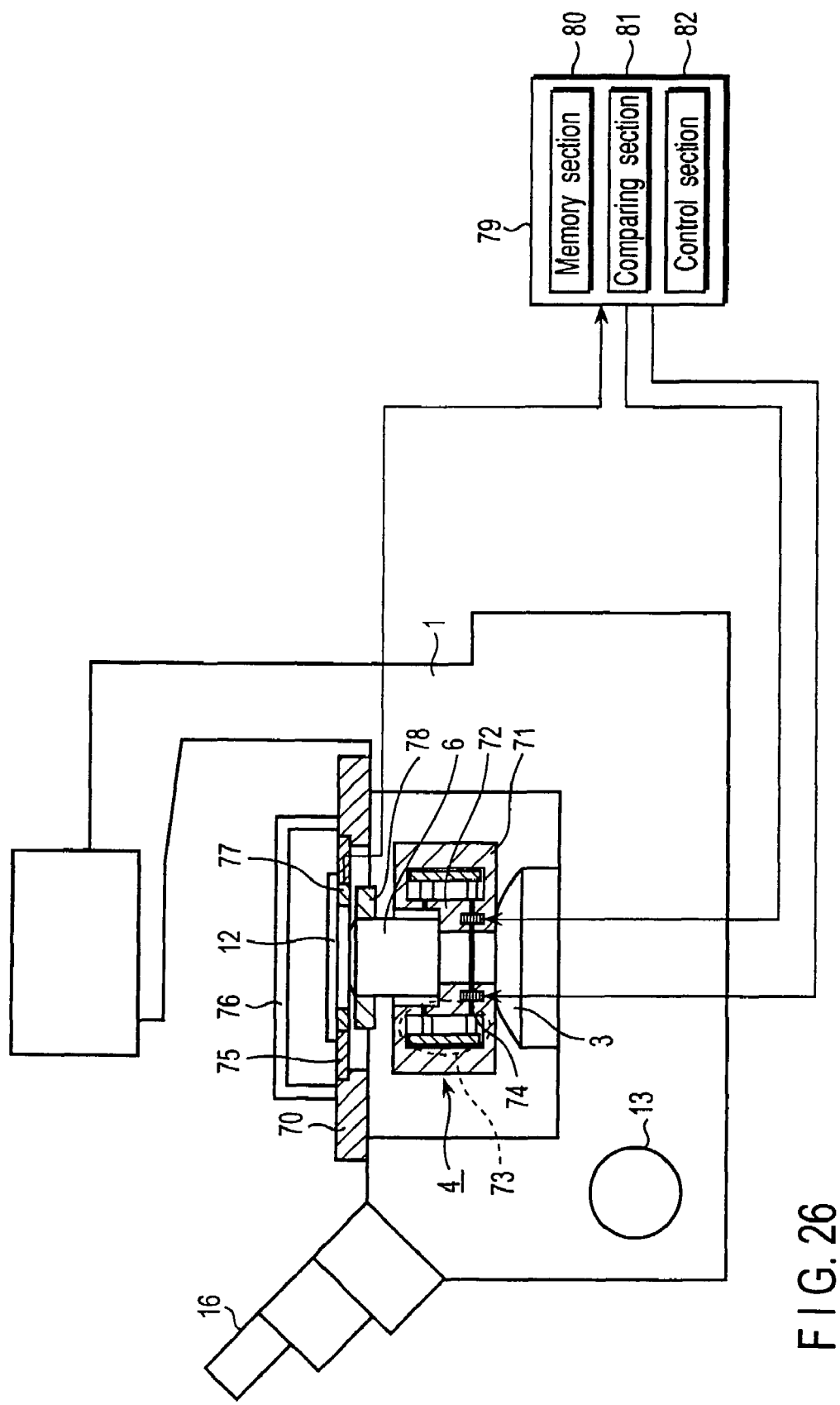
FIG. 26 is a view showing an inverted microscope with a focus stabilizing apparatus of a twenty-second embodiment of the present invention applied thereto.

FIG. 26 is a view showing a structure of an inverted type microscope with the focus stabilizing apparatus of the present invention applied thereto. The twenty-second embodiment is suitable to the observation of a living cell, in particular, over an extended period of time.

A stage 2 is provided on a microscope body 1 and a revolver 3 is arranged below the stage 2 in a way to correspond to the stage 2. A position adjusting apparatus 4 is mounted on a revolver 3 and adapted to adjust a relative distance between an objective lens 6 and an observation sample 12.

Figure 27:
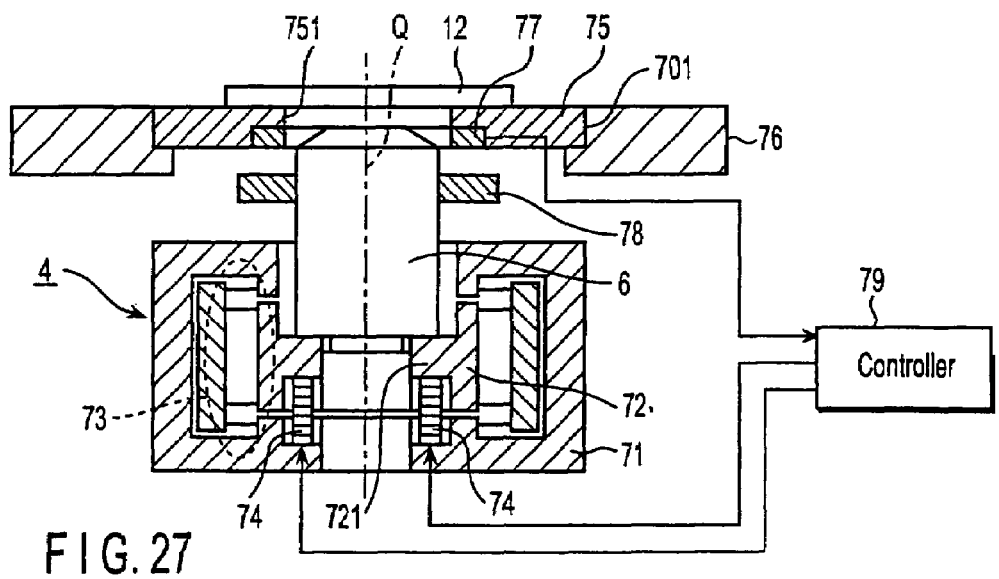
FIG. 27 is an enlarged view showing a structure of a position adjusting device used for the focus stabilizing apparatus above.

FIG. 27 is an enlarged view showing a structure of the position adjusting device 4. The device 4 has a fixing base 71, a minute movement table 72, parallel springs 73 and piezoelectric actuators 74.

The fixing base 71 is so formed as to have a cylindrical configuration. An objective threaded section, not shown, is formed on the open end portion on the lower side of the fixing base 71 and adapted to be threadably inserted into an objective mount hole of the revolver 3.

The minute movement table 72 is arranged in an hollow section of the fixing base 71 and formed to have a cylindrical configuration. The minute movement table 72 has an objective support section 721 provided in a substantially intermediate position of the hollow section. The objective support section 721 extends in an optical axis Q direction and supports an objective lens 6 along a center axis direction (optical axis Q direction) of the fixing lens 6.

Each piezoelectric actuator 74 is arranged between the objective support section 721 and the fixing base 71 and the respective piezoelectric actuators 74 are located in those positions symmetric to the optical axis Q of the objective lens 6.

The piezoelectric actuators 74 perform an extending/contracting operation, based on an electric signal and adapted to minutely move the minute movement table 72 in the optical axis Q direction through the extending/contracting operation.

The respective parallel springs 73 are arranged between the fixing base 71 and the minute movement table 72 and located in those positions symmetric to the optical axis Q. The parallel springs 73 support the minute movement table 72 relative to the fixing base 71 to allow it to be smoothly moved in a parallel direction to the optical axis Q direction.

Figure 28:
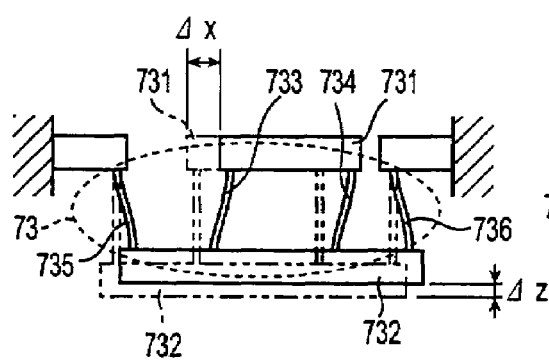
FIG. 28 is an explanatory view showing parallel springs used for the focus stabilizing apparatus above.

As shown in FIG. 28, the parallel springs 73 couple a pair of moving bodies 731, 732 together by a pair of leaf springs 733, 734. It is to be noted that the pair of moving bodies 731, 732 are arranged in a parallel relation and that the pair of leaf springs 733, 734 are arranged in a parallel relation.

The parallel springs 73 couple both end portions of the moving body 732 to a fixing section through another pair of leaf springs 735, 736. It is to be noted that the pair of leaf springs 735, 736 are arranged in parallel relation.

Thus, the moving body 731 while deforming the leaf springs 733, 734, is moved by $\Delta x$ from a position as indicated by a broken line to a position as indicated by a solid line. Then, the moving body 732, while deforming the leaf springs 735, 736, is raised by $\Delta z$ to a position as indicated by the solid line and so moved. By doing so, the height position on the moving body 731 side is maintained at all times to a non-displaced state.

Figure 29:
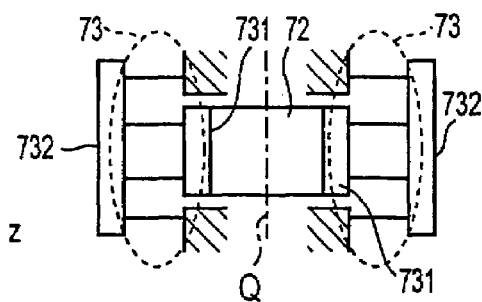
FIG. 29 is an explanatory view showing parallel springs used for the focus stabilizing apparatus above.

If, therefore, the parallel springs 73 are arranged in those positions symmetric to the optical axis Q of the objective-lens 6 as shown in FIG. 29, then the minute movement table 72 is smoothly moved in a way parallel to the optical axis Q direction and, at this time, even at the minute movement of the minute movement table 72, there is never produced any pull force, etc., acting in a direction orthogonal to the optical axis Q.

Figure 30:
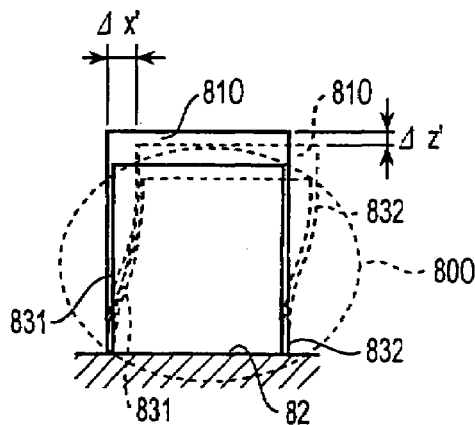
FIG. 30 is an explanatory view showing conventional parallel springs corresponding to the parallel springs used for the focus stabilizing apparatus above.

On the other hand, as an ordinary parallel leaf spring 800 there is one as shown in FIG. 30. This parallel leaf spring 800 is comprised of a moving body 81 arranged parallel to a fixing section 82 and coupled by a pair of leaf springs 831, 832. It is to be noted that the pair of leaf springs 831, 832 are arranged in a parallel way.

In such an arrangement, if the moving body 810 is moved, under a deformation of the leaf springs 831, 832, from a position as indicated by a solid line, by $\Delta x'$, to a position as indicated by a broken line of FIG. 30, the moving body 810, itself is moved in its height direction to an extent $\Delta z'$.

Figure 31:
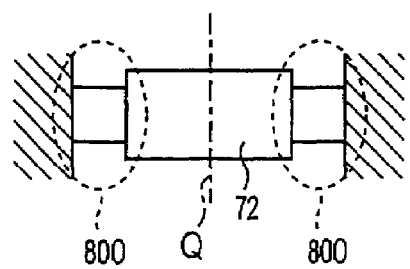
FIG. 31 is an explanatory view showing conventional parallel springs corresponding to parallel springs for the focus stabilizing apparatus above.

By doing so, parallel springs 800 are arranged in those positions symmetric to an optical axis Q as shown in FIG. 31. Then, by a minute movement of a minute movement table 72, a pull force acts in a direction orthogonal to the optical axis Q and, under such normal parallel springs 800, the minute movement table 72 is not smoothly moved in the optical axis Q direction.

In FIG. 27, a hole 701 is formed in a stage 70 and situated in a position corresponding to the optical axis Q of the objective lens 8. An intermediate seat 75 is placed on the stage 2 having the hole 701.

In the intermediate seat 75 there is an observation hole 751. The observation hole 751 is formed in a position corresponding to the optical axis Q of the objective lens 6 and an observation sample 12 of a living cell is placed over the observation hole 751. In this case, a warming chamber 76 is provided around the observation sample 12.

A displacement sensor 77 is arranged along the observation hole 751 of the intermediate seat 75 and so formed as to have a ring-like configuration. The displacement sensor 77 is comprised of, for example, an electrostatic capacity sensor. It is desirable that the sensor 77 be set in the proximity of the observation sample 12.

Further, a sensor target 78 corresponding to the displacement sensor 77 is provided on the objective lens 6. The displacement sensor 77 is adapted to provide an output corresponding to a distance between the objective lens 9 and the observation sample 11 by detecting the sensor target 78. This sensor 77 is connected to a controller 79.

The controller 79 has a memory section 80, a comparing section 81 and a control section 82. The memory section 80 stores a detection signal outputted from the displacement sensor 77 in a just-in-focus state in which an alignment is made between the observation sample 12 and the focal point of the objective lens 6.

The comparing section 81 is such that, when a defocusing state occurs due to a variation in distance between the observation sample 12 and the objective lens 6 caused by a variation of the ambient temperature, it compares a detection signal (output value) outputted from the displacement sensor 77 at that time with an output value of the displacement sensor 77 stored in the memory section 80 at a just-in-focus time.

The control section 82 outputs an electric signal necessary to cancel a distance variation between the observation sample 12 and the objective lens 6 from a result of comparison by the comparing section 81 to the piezoelectric actuator 74.

A focus setting handle 13 is provided on a microscope body 1 and, by being rotation operated, moves the revolver 3 in a direction along the optical axis Q.

An observation image of the observation sample 12 is projected onto tan observation optical system in the microscope body 1 through the objective lens 6 and can be observed through an eyepiece 17. It is to be noted that the structure of the observation optical system is the same as that of the observation optical system in FIG. 1.

Now the operation of this embodiment thus arranged will be explained below.

First, the focus setting handle 13 is rotation operated to set a positional alignment between the observation sample 12 and the focal point of the objective lens 6. That is, when the focus setting handle 13 is rotation operated, the revolver 3 is moved in the optical axis Q direction to allow a relative positional relation between the observation sample 12 and the focal point of the objective lens 6 to vary and, by doing so, a focus setting is achieved between the observation sample 12 and the focal point of the objective lens 6.

In this just-in-focus state, the displacement sensor 77 detects the sensor target 78 and outputs a detection signal corresponding to a distance between the objective lens 9 and the observation sample 11. This detection signal is sent to the controller 79.

The controller 79 allows the detection signal which is outputted from the displacement sensor 77 to be stored as a just-in-focus one in the memory section 15a.

If the ambient temperature varies in such a state, a temperature drift occurs in mechanical component parts and a distance between the observation sample 12 and the objective lens 6 varies, thus causing a defocusing state to occur.

At this time, the comparing section 81 of the controller 79 compares a detection signal which is outputted from the displacement sensor 77 with the output value of the sensor 77 stored in the memory section 80 at the just-in-focus time.

The control section 82 outputs the electric signal necessary to cancel a distance variation between the observation sample 12 and the objective lens 6 from a result of comparison by the comparing section 81 to the piezoelectric actuator 74.

By doing so, the piezoelectric actuator 74 performs an extending/contracting operation. The minute movement table 72 supported by the parallel springs 73 is moved parallel to the optical axis Q direction in accordance with this extending/contracting operation and, with this movement, the objective lens 6 supported on the minute movement table 72 is moved in the optical axis Q direction.

At this time, the moving direction of the objective lens 6 is opposite to the direction in which defocusing occurs due to the ambient temperature variation. Further, the movement amount of the objective lens 6 is the same as the distance of the defocusing resulting from the variation in the ambient temperature.

By doing so, adjustment is made to achieve a quick alignment between the observation sample 12 and the focal point of the objective lens 6.

According to the above-mentioned twenty-second embodiment, even if, for example, a temperature drift occurs in the mechanical component parts due to a variation in the ambient temperature caused by the ON/OFF of an illumination and internal power supply as well as the operation of an air conditioning equipment, the structure receives no adverse influence and it is possible to maintain an aligned state between the observation sample and the focal point of the objective lens 6 and to observe the sample at all times under a stable condition.

Further, since the variation of the distance between the observation sample 12 and the objective lens 6 is detected by the displacement sensor 77 and immediately corrected by the output of the displacement sensor, it is possible to shorten a time taken until a temperature compensation is made.

Even if the observation sample 12 is surrounded with the warming chamber 76, the distance variation between the observation sample 12 and the objective lens 6 is detected by the displacement sensor 77 and it is possible to compensate the temperature drift even in this case.

Since the fixing base 71 is so structured as to be threadably inserted into the objective mount hole of the revolver 3, it can be readily attached to, and detached from, the microscope without making any major remolding on the microscope side.

The parallel springs 73 and piezoelectric actuators 74 are, respectively, arranged in those positions symmetric to the optical axis Q and the minute movement table 72 can be smoothly moved in a manner parallel to the optical axis Q direction. This can avoid any unstable state, such as a tilt of the objective lens's optical axis Q.

Since electric signals can be applied independently to the corresponding piezoelectric actuators 74 by the controller 79, it is possible to adjust the individual differences of the displacements of the respective piezoelectric actuators 74.

The displacement sensor 77 provided at the intermediate seat 75 is so formed as to have a ring-like configuration and a better form of symmetry is ensured at the detection system. Further, more positive displacement detection is also ensured relative to the sensor target 78. Further, the displacement sensor 77, being made in a ring-like configuration, can secure a greater detection area and a greater displacement detection distance. Further, no much linearity is required for the displacement sensor 77 since the displacement is not measured. By doing so it is possible to apply the present invention to the case where, like an erect type microscope, the observation sample 12 is located between the stage and the objective lens and where its atmosphere relative to the sensor target 78 is other than the air.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A focus stabilizing apparatus comprising:
    an objective lens arranged underneath an observation sample so as to face the observation sample;
    a fixing base;
    a sample base on which the observation sample is placed;
    a focus adjusting mechanism, which continuously extends between the sample base and the fixing base and surrounds the objective lens, for varying a distance along an optical axis of the objective lens between the sample base and the fixing base;
    a minute movement table to which the objective lens is fixed;
    parallel springs situated between the fixing base and the minute movement table to allow the minute movement table to be moved in an optical axis direction of the objective lens;
    an actuator provided between the fixing base and the minute movement table to minutely displace the minute movement table in the optical axis direction of the objective lens;
    a displacement sensor provided between the fixing base and the minute movement table for detecting a displacement amount of the objective lens; and
    a controller which allows the actuator to perform an extending/contracting operation based on a detection output of the displacement sensor to control the objective lens and bring the objective lens to a just-in-focus position relative to the observation sample.

2. The focus stabilizing apparatus according to claim 1, wherein when the objective lens is focused on the observation sample by the focus adjusting mechanism, the control means keeps the objective lens focused on the observation sample.

3. The focus stabilizing apparatus according to claim 1, wherein the focus stabilizing apparatus is provided in an inverted microscope, and the fixing base is fixed to a revolver of the inverted microscope.

4. A focus stabilizing apparatus comprising:
    an objective lens arranged underneath an observation sample so as to face the observation sample;
    a fixing base;
    a stage on which the observation sample is placed;
    a minute movement table to which the objective lens is fixed;
    parallel springs situated between the fixing base and the minute movement table to allow the minute movement table to be moved in an optical axis direction of the objective lens;
    an actuator provided between the fixing base and the minute movement table to minutely displace the minute movement table in the optical axis direction of the objective lens;
    a displacement sensor provided between the stage and the objective lens for detecting a displacement amount produced between the objective lens and the stage due to a change in ambient temperature; and
    a controller which allows the actuator to perform an extending/contracting operation based on a detection output of the displacement sensor to control the objective lens and bring the objective lens to a justin-focus position relative to the observation sample.

5. The focus stabilizing apparatus according to claim 4, wherein said control means includes:
    a memory section for storing an output of the displacement sensor corresponding to a just-in-focus state between the observation sample and a focal point of the objective lens;
    a comparing section for comparing an output of the displacement sensor and an output of the displacement sensor stored in the memory section; and
    a control section for outputting an electrical signal for canceling a distance variation between the observation sample and the objective lens based on a result of comparison by the comparing section.

6. The focus stabilizing apparatus according to claim 4, wherein the focus stabilizing apparatus is provided in an inverted microscope, the fixing base is fixed to a revolver of the inverted microscope, and the stage is fixed on the inverted microscope above the revolver; and
    wherein a distance between the objective lens and the stage changes when the change in the ambient temperature causes thermal drift of at least one of the inverted microscope, the fixing base, the revolver, and the stage.

7. The focus stabilizing apparatus according to claim 4, wherein the displacement sensor comprises
    a target provided in a vicinity of an end of the objective lens, and a detector provided at the stage.

8. A focus stabilizing apparatus comprising:
    an objective lens arranged underneath an observation sample so as to face the observation sample;
    a fixing base;
    a stage on which the observation sample is placed;
    a minute movement table to which the objective lens is fixed;
    a movement mechanism which is provided between the fixing base and the minute movement table, and which allows the minute movement table to move in an optical axis direction of the objective lens;
    a drive mechanism which is provided between the fixing base and the minute movement table, and which is adapted to minutely displace the minute movement table in the optical axis direction of the objective lens;
    a displacement sensor provided between the stage and the objective lens to detect a displacement amount produced between the objective lens and the stage because of a change in ambient temperature; and
    a controller which allows the drive mechanism to operate based on a detection output of the displacement sensor to control the objective lens and to bring the objective lens to a just-in-focus position relative to the observation sample.

9. The focus stabilizing apparatus according to claim 8, wherein the focus stabilizing apparatus is provided in an inverted microscope, the fixing base is fixed to a revolver of the inverted microscope, and the stage is fixed on the inverted microscope above the revolver; and
    wherein a distance between the objective lens and the stage changes when the change in the ambient temperature causes thermal drift of at least one of the inverted microscope, the fixing base, the revolver, and the stage.

* * * * *